(12) United States Patent
Wang et al.

(10) Patent No.: US 11,491,710 B2
(45) Date of Patent: Nov. 8, 2022

(54) PHOTOCURABLE, SELF-HEALABLE, AND SHAPE-MEMORIZABLE POLYMERS FOR ADDITIVE MANUFACTURING

(71) Applicant: UNIVERSITY OF SOUTHERN CALIFORNIA, Los Angeles, CA (US)

(72) Inventors: Qiming Wang, Los Angeles, CA (US); Kun-Hao Yu, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 0 days.

(21) Appl. No.: 17/185,047

(22) Filed: Feb. 25, 2021

(65) Prior Publication Data
US 2021/0268721 A1  Sep. 2, 2021

Related U.S. Application Data

(60) Provisional application No. 62/982,569, filed on Feb. 27, 2020.

(51) Int. Cl.
| | |
|---|---|
| *B33Y 70/00* | (2020.01) |
| *B29C 64/124* | (2017.01) |
| *B33Y 10/00* | (2015.01) |
| *B33Y 50/02* | (2015.01) |
| *B33Y 80/00* | (2015.01) |
| *C08G 18/38* | (2006.01) |
| *B29C 64/295* | (2017.01) |
| *C08G 18/75* | (2006.01) |
| *C08G 18/24* | (2006.01) |
| *B29C 64/386* | (2017.01) |

(52) U.S. Cl.
CPC .......... *B29C 64/124* (2017.08); *B29C 64/295* (2017.08); *B29C 64/386* (2017.08); *B33Y 10/00* (2014.12); *B33Y 50/02* (2014.12); *B33Y 70/00* (2014.12); *B33Y 80/00* (2014.12); *C08G 18/242* (2013.01); *C08G 18/3825* (2013.01); *C08G 18/3863* (2013.01); *C08G 18/755* (2013.01)

(58) Field of Classification Search
CPC . B33Y 10/00; C08G 18/3825; C08G 18/3863
See application file for complete search history.

(56) References Cited

U.S. PATENT DOCUMENTS

| | | | |
|---|---|---|---|
| 2021/0046696 A1* | 2/2021 | Achten | C08G 18/246 |
| 2021/0087324 A1* | 3/2021 | Achten | C09D 11/102 |

* cited by examiner

*Primary Examiner* — James Sanders
(74) *Attorney, Agent, or Firm* — Snell & Wilmer LLP

(57) ABSTRACT

A method of making an ink for use in additive manufacturing of a self-healable and shape-memorizable product includes mixing a diol with isophorone diisocyanate, dimethylacetamide, and dibutyltin dilaurate to form a first solution. The method further includes mixing the first solution with 2-Hydroxyethyl disulfide to form a second solution. The method further includes mixing the second solution with 2-Hydroxyethyl methacrylate to form a third solution. The method further includes mixing the third solution with a tributylphosphine, a photoinitiator, and a photoabsorber to facilitate additive manufacturing of the ink.

9 Claims, 21 Drawing Sheets

HEMA

IPDI

HEDS

PTMEG iii

Polymer ink

PHOTOCURABLE, SELF-HEALABLE, AND SHAPE-MEMORIZABLE POLYMERS FOR ADDITIVE MANUFACTURING

CROSS-REFERENCE TO RELATED APPLICATIONS

This application claims the benefit and priority of U.S. Provisional Application No. 62/982,569, titled Photocurable, Self-Healable, and Shape-Memorizable Polymers for Additive Manufacturing and filed on Feb. 27, 2020, the entire contents of which is hereby incorporated by reference in its entirety.

STATEMENT AS TO FEDERALLY SPONSORED RESEARCH

This invention was made with government support under contract numbers FA9550-18-1-0192 awarded by the Air Force Office of Scientific Research (AFOSR) and 1762567 awarded by the National Science Foundation (NSF). The government has certain rights in this invention.

BACKGROUND

1. Field

This specification relates to photocurable, self-healable, and shape-memorizable polymers for additive manufacturing, methods of making the same, and methods for additive manufacturing using such polymers.

2. Description of the Related Art

Precisely-architected lattice structures with extraordinary properties including low density, high specific stiffness, high specific strength, and high energy absorption, have been used in a broad range of engineering applications, such as aerospace panels, impact absorbers, acoustic modulators, thermal exchangers, battery electrodes, and biomedical scaffolds. A key limitation of most of the existing lattice structures is that their properties and functions may not be modulated once fabricated. A promising direction in the field is designing transformable lattice structures whose configurations can be reversibly switched to enable tunable properties. Existing transforming mechanisms primarily rely on non-fracture deformation, such as origami, instability, shape memory, and liquid crystallinity. Fracture has never been harnessed to transform lattice structures, because fracture has long been considered as a failure mode to compromise the structural integrity and property, and healing fracture is also typically challenging for 3D-architected lattice structures. However, fracture and the corresponding healing, if successfully realized to transform lattice structures, would greatly benefit a broad range of engineering applications in two aspects. First, damages of lattice structures may be smartly managed and recovered; examples include lightweight panel structures that may recover from foreign-object-impact-induced damages, body armor that may self-repair damages from bullets or other shrapnel on the battlefield, lattice dampers that may regain damping property after healing over-load crashes, and biomedical scaffolds that may imitate self-healable bones. Second, fracture-healing can be a new tool to smartly tune the lattice connectivity, thus reversibly switching static or dynamic properties of lattice structures.

Despite the great potential, the realization of fracture-healing in lattice structures has never occurred, primarily due to two technical barriers. First, innovating materials feasible for manufacturing self-healable lattice structures is challenging. Taking photopolymerization-based additive manufacturing (e.g., stereolithography, polyjet, self-propagation photopolymer waveguides, and two-photon lithography) as an example, the required material should be both photocurable and self-healable; this kind of material remains largely undiscovered. Any existing photocurable and self-healable elastomers have stiffnesses that are relatively low (10-50 kilopascals (kPa)), thus not suitable for the application of force-sustaining lattice structures. Besides, although high-strength self-healable polyurethane may have been reported, a method for molecularly tailoring high-strength self-healable polyurethane to enable photocuring for additive manufacturing has never been discovered. Second, healing of lattice structures requires precise contact or alignment of fracture interfaces, while damages of lattice structures are typically associated with shape-change around fracture locations. The fractures cannot be healed properly without the contact of fracture interfaces. Existing healing experiments of self-healing bulk materials typically rely on manual contact of fracture interfaces; however, manual contact is challenging for deep cracks or complex lattice architectures. Consequently, the development of transformable lattice structures that can heal fractures is still an outstanding engineering challenge.

Thus, there is a need in the art for photocurable, self-healable, and shape-memorizable polymers for additive manufacturing, methods of making the same, and methods for additive manufacturing using such polymers.

SUMMARY

Described herein is a method of making an ink for use in additive manufacturing of a self-healable and shape-memorizable product. The method includes mixing a diol with isophorone diisocyanate, dimethylacetamide, and dibutyltin dilaurate to form a first solution. The method further includes mixing the first solution with 2-Hydroxyethyl disulfide to form a second solution. The method further includes mixing the second solution with 2-Hydroxyethyl methacrylate to form a third solution. The method further includes mixing the third solution with a tributylphosphine, a photoinitiator, and a photoabsorber to facilitate additive manufacturing of the ink.

Also described is a method of additively manufacturing a self-healable and shape-memorizable structure. The method includes creating or obtaining a computer-aided-design (CAD) model of a three-dimensional structure. The method further includes splitting the CAD model into image sequences with designated spacing in a vertical direction. The method further includes projecting the image sequences onto a resin bath filled with a self-healable and shape-memorizable ink. The method further includes exposing the self-healable and shape-memorizable ink to image light to solidify the self-healable and shape-memorizable ink to form a layer structure bonded to a printing stage.

Also described is a method of additively manufacturing a self-healable and shape-memorizable structure. The method includes forming or obtaining a self-healable and shape-memorizable ink. The method further includes using additive manufacturing to create a lattice structure using the self-healable and shape-memorizable ink, the lattice structure being self-healable and shape-memorizable.

BRIEF DESCRIPTION OF THE DRAWINGS

Other systems, methods, features, and advantages of the present invention will be or will become apparent to one of ordinary skill in the art upon examination of the following figures and detailed description. Additional figures are provided in the accompanying Appendix and described therein.

DETAILED DESCRIPTION

Figure 1:
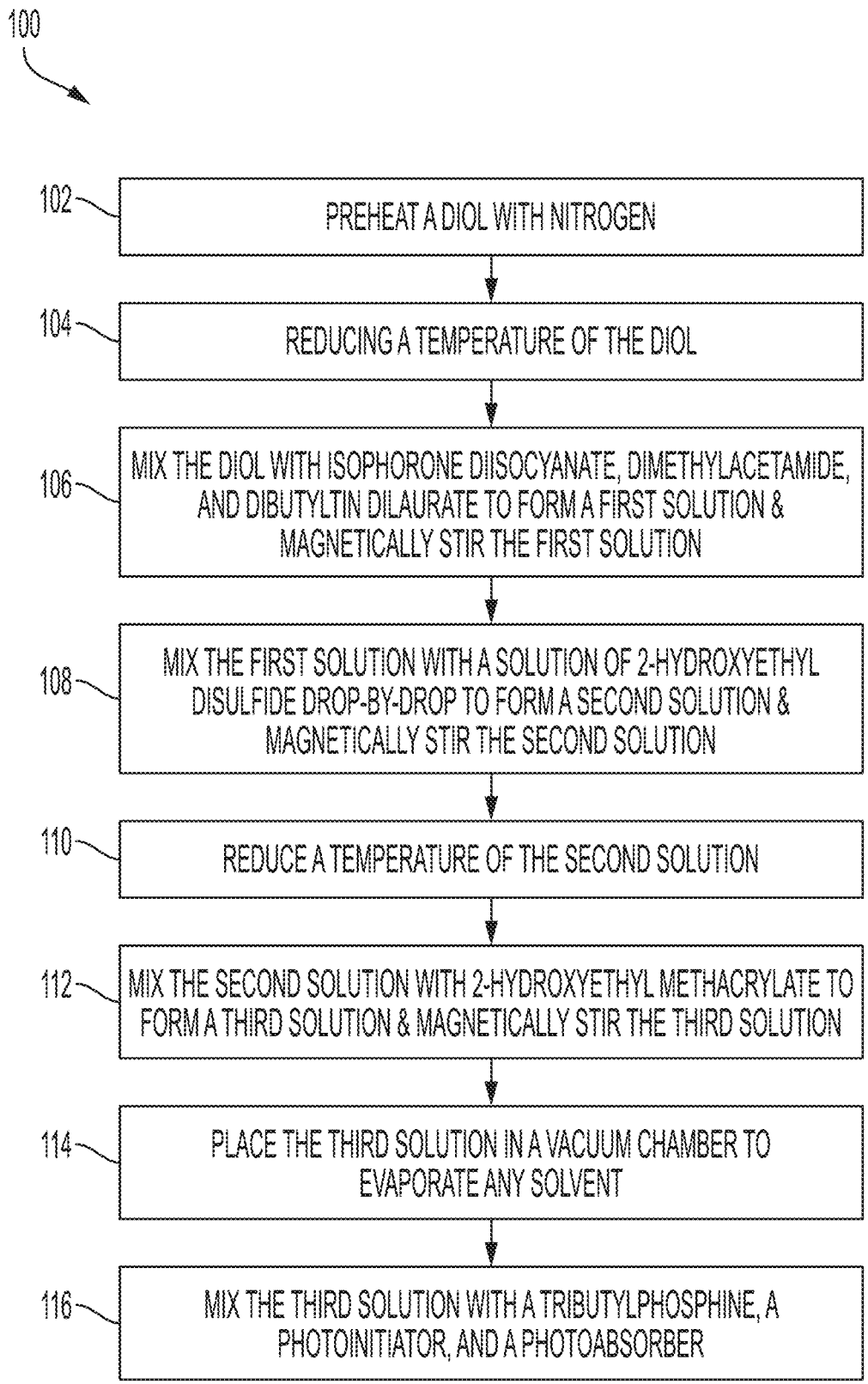
FIG. 1 is a flowchart illustrating a method for making an ink for use in additive manufacturing of a self-healable and shape-memorizable product, according to various embodiments of the present disclosure.

Emerging transformable lattice structures provide promising paradigms to reversibly switch lattice configurations and thus on-demand tune their properties. The existing transforming mechanisms are limited to non-fracture deformation, such as origami, instability, shape memory, and liquid crystallinity. The present disclosure presents a class of transformable lattice structures enabled by fracture and shape-memory-assisted healing. The lattice structures may be additively-manufactured with a molecularly-designed photopolymer capable of both fracture-healing and shape-memory. The present disclosure shows that three-dimensional (3D)-architected lattice structures with various volume fractions can heal fatal fractures to fully restore stiffness and strength over 2 to 10 healing cycles. Besides, coupling with the shape-memory effect, the lattice structures can recover fracture-associated distortion and then heal fracture interfaces, thus enabling healing of lattice wing damages, mode-I fractures, denting-induced crashes, and foreign object impacts. Moreover, through harnessing the coupling of fracture and shape-memory-assisted healing, the present disclosure demonstrates reversible configuration transformations of lattice structures to enable switching among property states of different stiffnesses, vibration transmittances, and acoustic absorptions. These healable, memorizable, and transformable lattice structures may find broad applications in next-generation aircraft panels, automobile frames, body armor, impact mitigators, vibration dampers, and acoustic modulators.

The present disclosure presents a class of transformable lattice structures enabled by fracture and shape-memory-assisted healing. The lattice structures are additively manufactured via a projection stereolithography system with a polymer ink that features acrylate groups for photocuring and disulfide groups for fracture-healing. The printed solid features Young's modulus as high as 500 megapascals (MPa), similar to that of a typical Teflon (200-600 MPa). The present disclosure shows that 3D-architected lattice structures with various volume fractions can heal fatal fractures to fully restore stiffness and strength over 2-10 healing cycles. Besides, coupled with the shape-memory effect, damaged lattice structures can first recover fracture-associated shape-change to align fracture interfaces, and then heal the fracture interfaces, thus enabling healing of lattice wing damages, mode-I fractures, denting-induced crashes, and foreign-object-impact-induced damages. Moreover, through harnessing the coupling of fracture and shape-memory-assisted healing, the present disclosure demonstrates reversible configuration transformations of lattice structures to enable switching among property states of different stiffnesses, vibration transmittances, and acoustic absorptions. Equipped with coupled features including additive-manufacturing, fracture-healing, and shape-memory, the lattice structures of the present disclosure may open promising avenues for smart lightweight structures that can reversibly transform architectures and recover damages through fracture-memory-healing cycles. These healable, memorizable, and transformable lattice structures may find broad applications in next-generation aircraft panels, automobile frames, body armor, impact mitigators, vibration dampers, and acoustic modulators.

Referring to FIG. 1, a method 100 for making an ink for use in additive manufacturing of a self-healable and shape-memorizable product is shown. The method 100 may begin in block 102 in which a diol is preheated with nitrogen. In block 104, the temperature of the pre-heated diol is reduced. In block 106, the diol is mixed with isophorone diisocyanate, dimethylacetamide, and dibutyltin dilaurate to form a first solution. The first solution may be magnetically stirred throughout the mixing process. In block 108, the first solution may be mixed with a solution of 2-Hydroxyethyl disulfide to form a second solution. The 2-Hydroxyethyl disulfide solution may be added to the first solution drop-by-drop, and the first solution may be magnetically stirred throughout the addition process. In block 110, the temperature of the second solution may be reduced. In block 112, the second solution may be mixed with 2-Hydroxyethyl methacrylate to form a third solution. This solution may be magnetically stirred throughout the mixing process. The solution(s) may be placed in a nitrogen environment throughout blocks 102 through 112. In block 114, the third solution may be placed in a vacuum chamber to evaporate any solvent. In block 116, the third solution may be mixed with a tributylphosphine, a photoinitiator, and a photoabsorber to facilitate additive manufacturing of the resulting ink.

Figure 2:
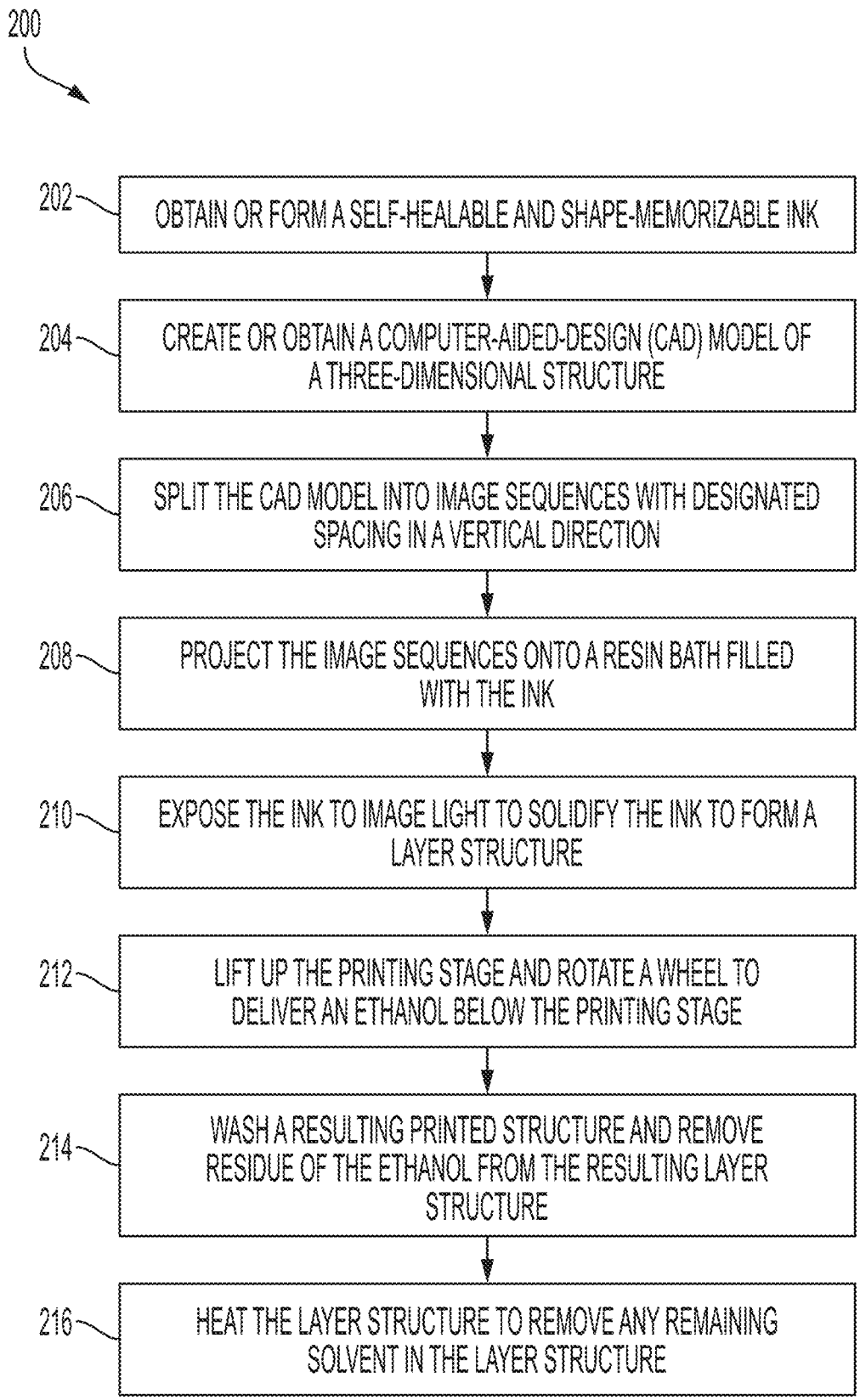
FIG. 2 is a flowchart illustrating a method for additively manufacturing a self-healable and shape-memorizable structure, according to various embodiments of the present disclosure.

Turning to FIG. 2, a method 200 for additively manufacturing a self-healable and shape-memorizable structure is shown. The method 200 may begin in block 202 in which a self-healable and shape-memorizable ink may be obtained or formed. For example, the ink may be formed using a method similar to the method 100 of FIG. 1. In block 204, a computer-aided-design (CAD) model of a three-dimensional model may be created or obtained. The three-dimensional model may be a model of a lattice structure such as a triangular lattice structure or a honeycomb lattice structure. The lattice structure may alternatively include any other lattice or non-lattice structure. In block 206, the CAD model may be split into image sequences with designated spacing in a vertical direction that corresponds to layers of additive manufacturing. In block 208, the image sequences may be projected onto a resin bath filled with the ink. In block 210, the ink may be exposed to image light to solidify the ink to form a layered structure. In block 212, the printing stage may be lifted up and a wheel may be rotated to deliver ethanol below the printing stage. In block 214, a resulting printed structure may be washed and ethanol residue may be removed from the resulting printed structure. In block 216, the layer structure may be heated to remove any remaining solvent.

Figure 3:
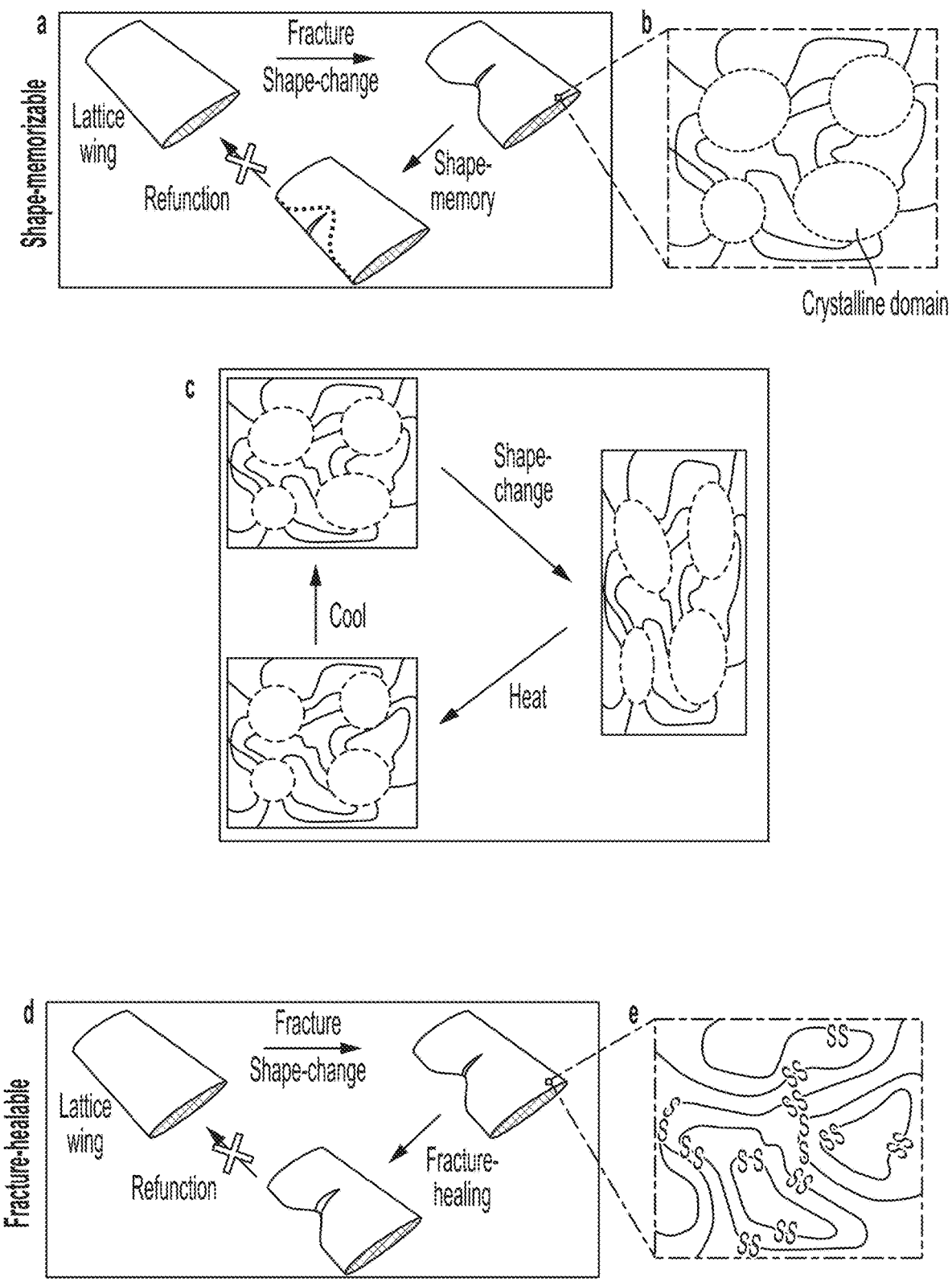
FIG. 3 is a drawing illustrating a design principle for transformable lattice structures enabled by fracture and shape-memory-assisted healing, according to various embodiments of the present disclosure.
Figure 3:
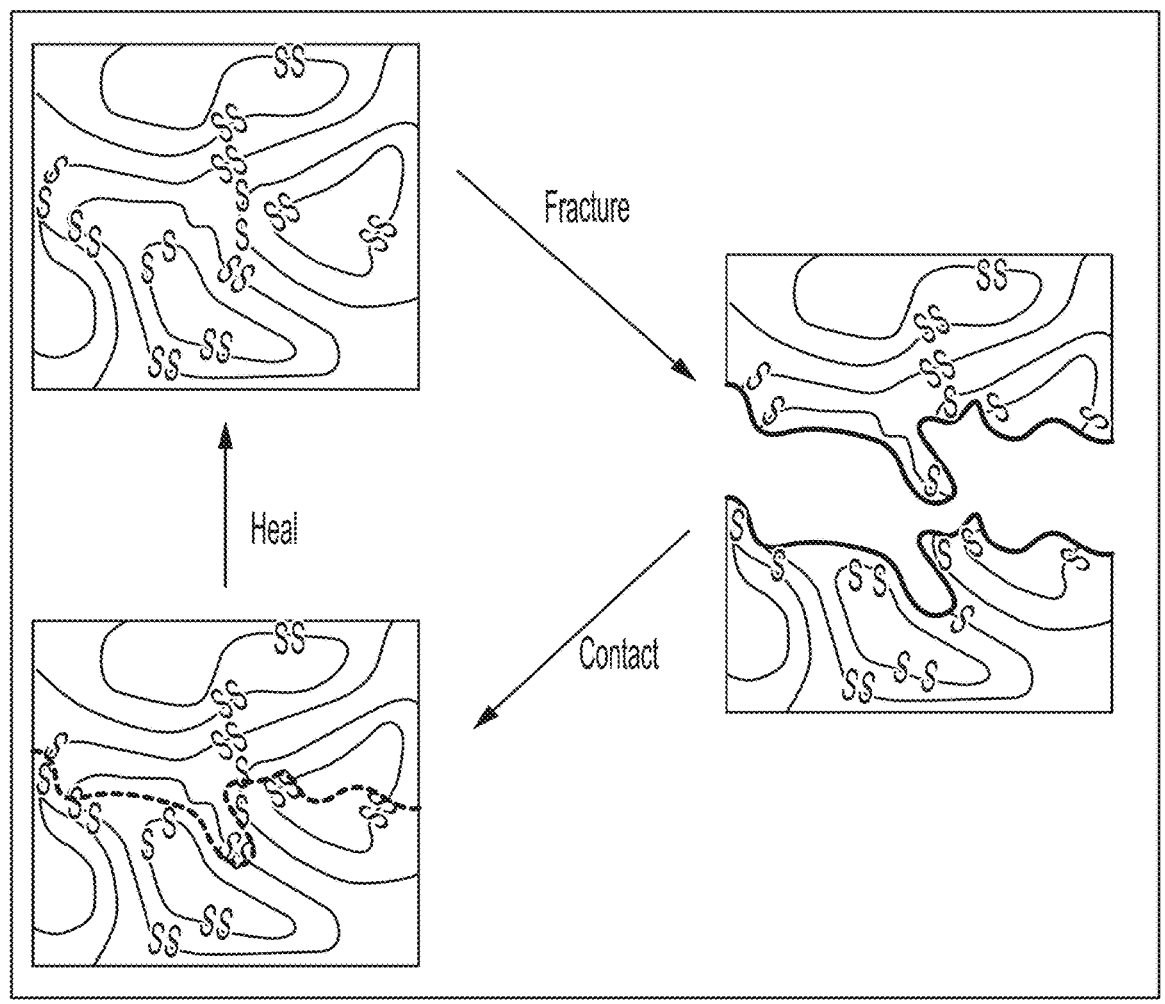
Figure 3:
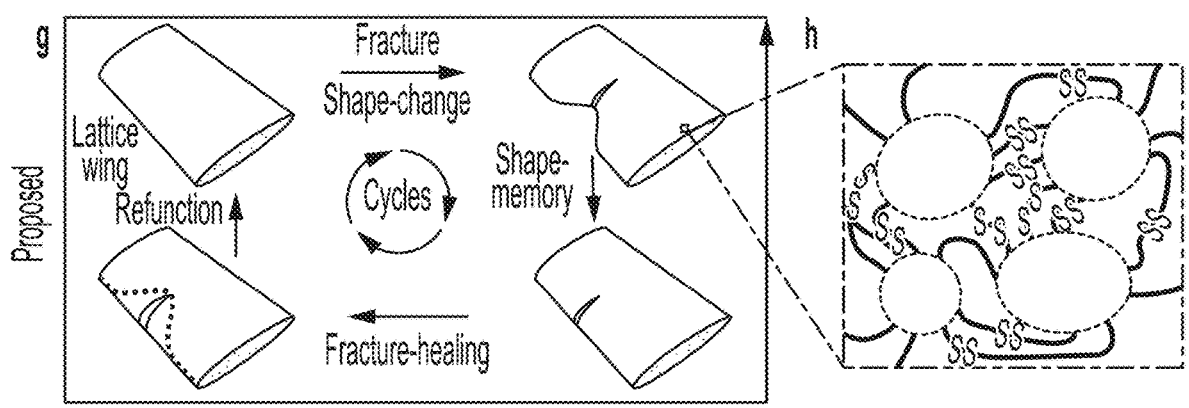
Figure 3:
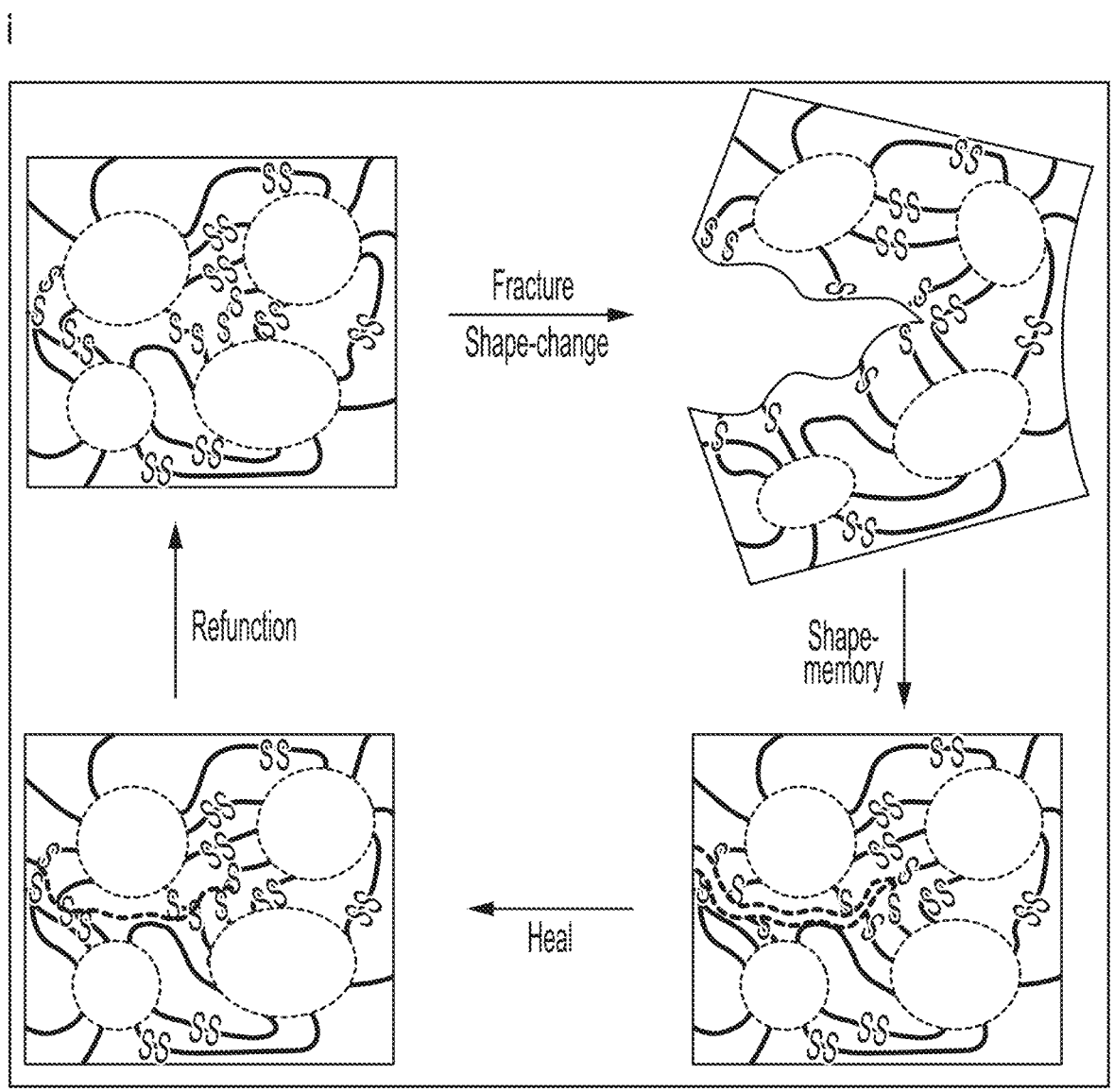
Figure 3:
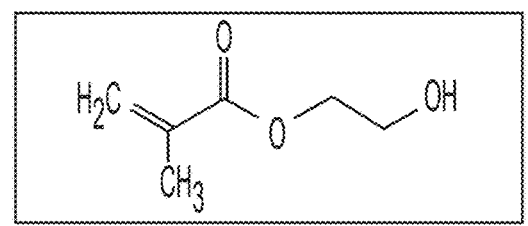
Figure 3:
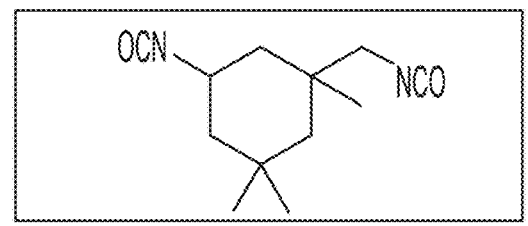
Figure 3:
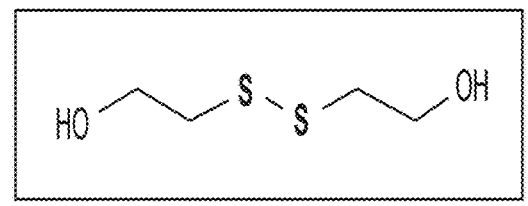
Figure 3:
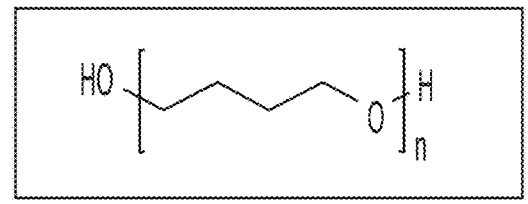
Figure 3:
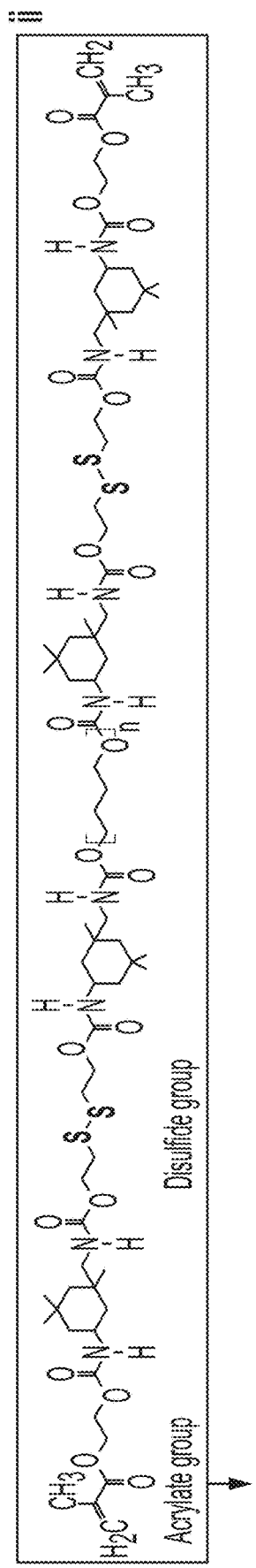
Figure 3:
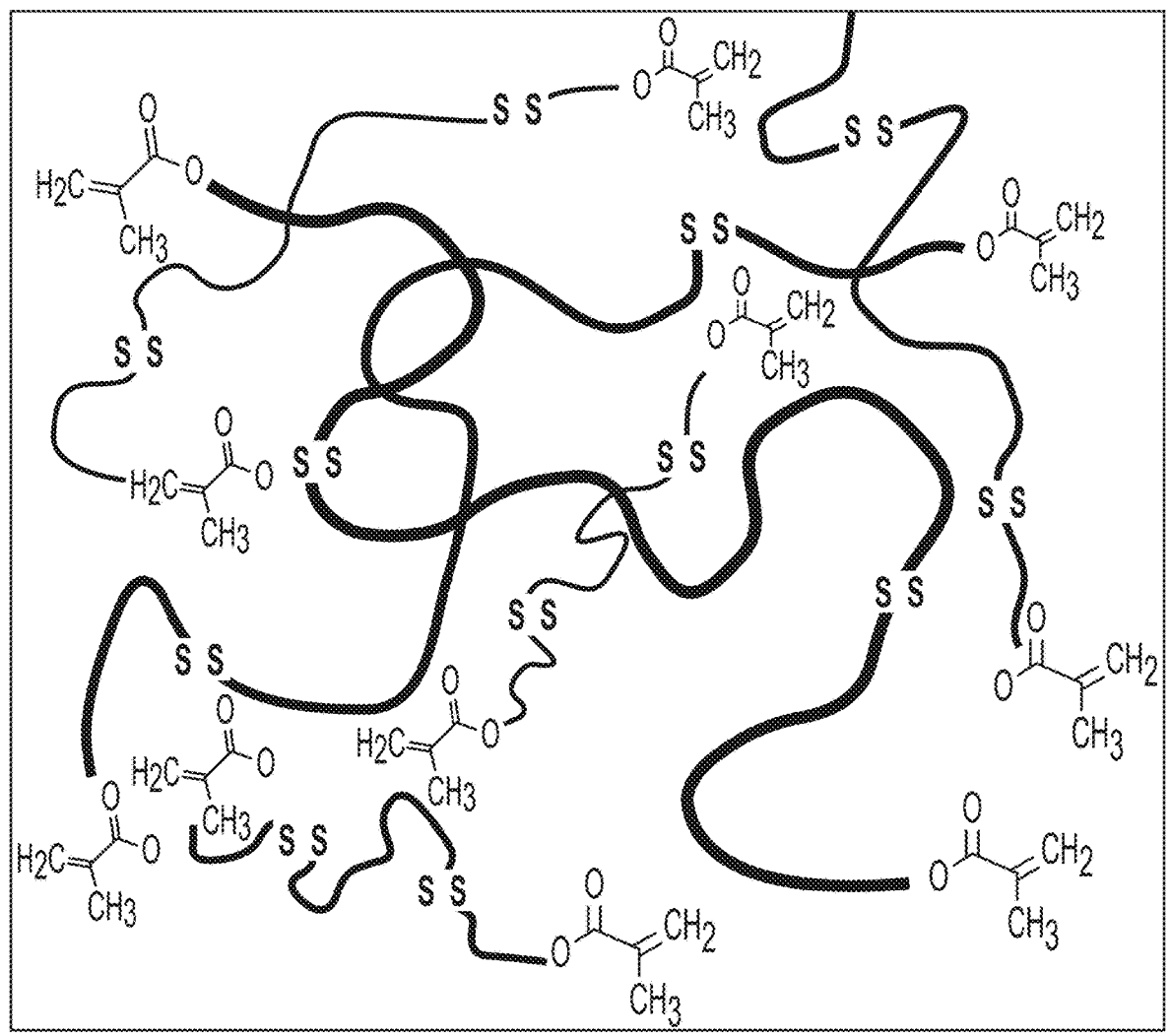
Figure 3:
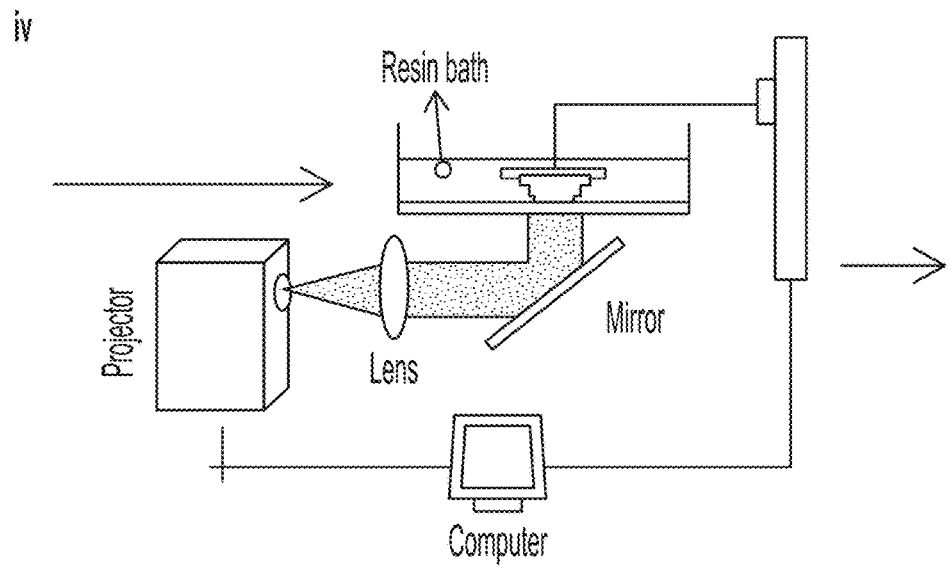
Figure 3:
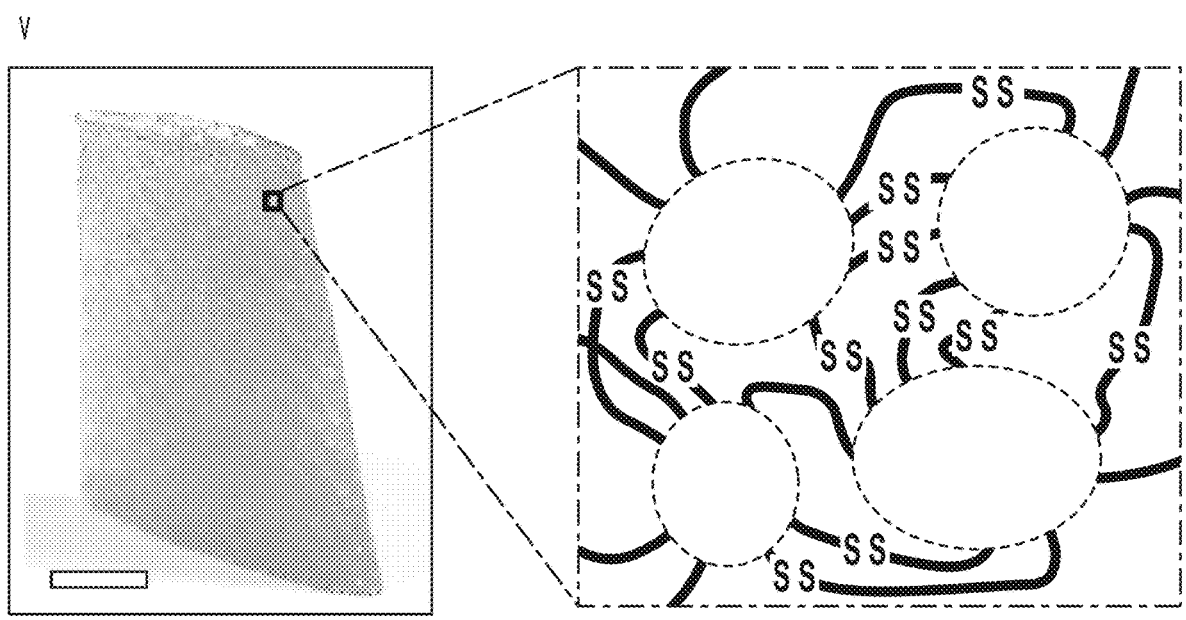
Figure 3:
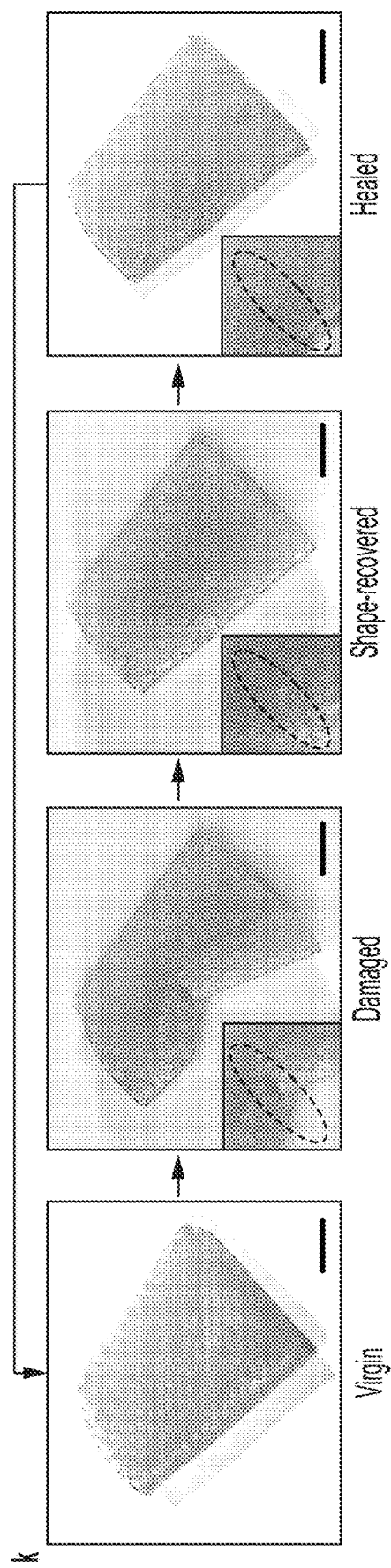

The disclosure now turns to design principles for transformable lattice structures. The design principle for transformable lattice structures enabled by fracture and shape-memory-assisted healing is motivated by limitations of existing lattice structures featuring either shape-memory (FIG. 3*a-c*) or self-healing (FIG. 3*d-f*). On one hand, when an external intervention forces a lattice structure to undergo both a fracture and a shape-change around the fracture location, a shape-memorizable lattice structure (which may be made of a semi-crystalline polymer) may recover the shape-change in a thermal cycle, while the fracture interface cannot be healed properly (FIG. 3*a-c*). On the other hand, a fracture-healable lattice structure may heal the fracture interface via reversibly forming dynamic bonds (e.g., disulfide bonds), while the damage-associated shape-change cannot be recovered properly (FIG. 3*d-f*). Therefore, both types of lattice structures may not fully recover the structural integrity or function.

The present disclosure presents a class of lattice structures made of polymers featuring both shape-memory and fracture-healing (FIG. 3*g-i*). In a typical working cycle, a damaged lattice structure with both shape-change and material-fracture undergoes first a shape-recovery process to align fracture interfaces, and then a fracture-healing process to fully repair the fractured interfaces (FIG. 3*g*). In this way, the damaged lattice structures are expected to fully recover the initial structural integrity and function, and even enable multiple damage-recovery cycles.

Polymers employed to fabricate the proposed lattice structures are designed based on urethane linkages (—NH—CO—O—) formed from a reaction between isocyanate groups (—NCO) and hydroxyl groups (—OH) (FIG. 3*j(i)*). The backbone of the polymer network is constructed by an aromatic diisocyanate (isophorone diisocyanate) and a diol (polytetramethylene ether glycol, PTMEG) via urethane linkages. To enable the self-healing property, the inventors covalently incorporated dynamic disulfide bonds into the network via linking a diol-terminated disulfide (HO~S—S~OH) (FIG. 3*j(i)*). The self-healing property primarily relies on disulfide metathesis reactions (assisted by a catalyst tributylphosphine) to bridge the fractured interface. Besides, to enable photocuring property for the stereolithography-based additive manufacturing, the inventors incorporated a hydroxyl-ended acrylate group ($CH_2$=CHCOO~OH) (FIG. 3*j(i)*). The acrylate groups can undergo a photo-radical-assisted addition reaction to solidify the polymer. Thus, the polymer ink for the stereolithography is made of disulfide-linked urethane-acrylate oligomers (FIG. 3*j(ii-iii)*). After photopolymerization, the solid polymer would embed not only dynamic disulfide bonds, but also crystalline domains formed through the intermolecular interactions of polymer chains (FIG. 3*j(vi)*). The existence of disulfide bonds within the polymer is verified by Raman Spectroscopy measurements that show a new peak with a band at ~520 $cm^{-1}$, compared to the control 1 polymer without disulfide bonds. This new band is consistent with the Raman band in the reported disulfide-bond-enabled self-healing polymers (500-550 $cm^{-1}$). The existence of the crystalline domain within the polymer is verified by a new endothermic peak at ~130 degrees Celsius (130° C.), compared to the control 2 self-healing polymer without crystalline domains. This endothermic peak is consistent with the ones in reported semi-crystalline polyurethanes.

Using a stereolithography system, the inventors fabricated lattice structures with complex architectures and geometries, as well as the coupled property of shape-memory and fracture-healing (FIG. 3*j(iv-vi)*). The manufacturing process is relatively rapid with a speed of ~25 micrometers per second (μm/s) for each layer and around 1.5 hours (h) for the lattice wing structure shown in FIG. 3*j(v)*. As a quick demonstration of a transformable lattice wing in FIG. 3*k*, the lattice wing is first damaged with both a material fracture and a shape dent. After heating to 80° C. for 1 minute (min), the dent can be recovered through a shape-memory process, and thus the initially distorted fracture interface is aligned. With the maintained temperature of 80° C. for another 6 hours, the fracture interface can be nicely healed to resume the structural function of the lattice wing. The fracture healing is verified by the zoom-in pictures and microscope images around the healing interface (insets of FIG. 3*k*).

In particular, FIG. 3*a* illustrates a schematic of the working principle of a shape-memorizable lattice wing structure. FIG. 3*b* illustrates a schematic of the molecular structure of a shape-memorizable semi-crystalline polymer. FIG. 3*c* illustrates a schematic of the shape-memory working cycle of a shape-memorizable polymer. FIG. 3*d* illustrates a schematic of the working principle of a fracture-healable lattice wing structure. FIG. 3*e* illustrates a schematic of the molecular structure of a fracture-healable polymer with dynamic disulfide bonds. FIG. 3*f* illustrates a schematic of the fracture-healing working cycle of a fracture-healable polymer. FIG. 3*g* illustrates a schematic of the working principle of the proposed lattice wing structure with the coupled properties of shape-memory and fracture-healing. FIG. 3*h* illustrates a schematic of the molecular structure of the proposed polymer with both crystalline domains and dynamic disulfide bonds. FIG. 3*i* illustrates a schematic of the working cycle of the proposed polymer. FIG. 3*j* illustrates a schematic and samples to show the additive manufacturing of a lattice wing: In particular, FIG. 3*j(i)* illustrates key monomers including 2-hydroxyethyl methacrylate (HEMA) to provide acrylate groups, isophorone diisocyanate (IPDI) to provide isocyanate groups, hydroxyethyl disulfide (HEDS) to provide disulfide groups, and polytetramethylene ether glycol (PTMEG) to provide hydroxyl groups; (ii) illustrates a chemical formula of the polymer ink with disulfide-linked urethane-acrylate oligomers; (iii) illustrates a schematic of the polymer ink with disulfide-linked urethane-acrylate oligomers; (iv) illustrates a schematic of the stereolithography system; (v) illustrates a lattice wing sample; and (vi) illustrates a schematic of the molecular structure of the proposed polymer. FIG. 3*k* illustrates an image sequence to show the fracture-memory-healing cycle of a lattice wing. The inset images show the zoom-in views of the fracture location. The scale bars in j-v and k represent 4 millimeters (mm).

The discussion now turns to the characterization of shape-memory and fracture-healing of the synthesized polymers. To qualitatively show the shape-memory property, the inventors first programmed a twist on a strip sample (with a molar mass of PTMEG 250 g $mol^{-1}$) at 80° C., and then fixed the twist by cooling to room temperature. As the temperature increases again to 80° C., the twisted sample returns to the initially flat shape within 1 min (FIG. 4a). The selection of 80° C. as the recovery temperature is because the glass transition temperature of the polymer is around 65-71° C. To quantify the shape-memory property, we measure the tensile stress-strain behaviors of polymer samples with PTMEG of various molar masses within a thermal cycle. As the molar mass of PTMEG increases, the polymer becomes more flexible with decreasing glassy transition temperature (from above 65-71° C. for PTMEG 250 g/mol to below 25° C. for PTMEG 1810 g/mol. The inventors found that polymers with different glassy transition temperatures exhibit different shape-memory cycles (FIGS. 4b-4d). A typical shape-memory cycle consists of four segments (FIGS. 4b-4d): (1)Loading: a polymer sample is uniaxially stretched to a prescribed strain $\varepsilon_l$ at 80° C. (2) Cooling: the strain slightly changes to $\varepsilon_c$ after cooling to 35° C. with the maintained load. (3) Unloading: the applied load is relaxed at 35° C. with the strain reducing to $\varepsilon_u$. (4) Recovering: the temperature increases again to 80° C. with the strain further reducing to $\varepsilon_r$. To quantify the shape-memory property, the inventors defined shape fixity and recovery ratios as $R_f = \varepsilon_u/\max(\varepsilon_l, \varepsilon_c)$ and $R_r = 1 - \varepsilon_r/\varepsilon_u$, respectively. With decreasing glassy transition temperature, though the shape recover ratio $R_r$ remains at 98-100%, the shape fixity ratio $R_f$ drastically decreases: 98% for PTMEG molar mass 250 g mol$^{-1}$, while ~1% for PTMEG molar mass 1810 g mol$^{-1}$ (FIGS. 4e-4g). Hence, the polymer with the lower PTMEG molar mass exhibits better shape-memory property for a thermal cycle within 35-80° C.

Besides the shape-memory property, the synthesized polymers with disulfide bonds also exhibit a self-healing property. To qualitatively show this, the inventors first cut a strip sample into two parts and then brought them into contact at 80° C. for 6 h (FIG. 4h). The microscopic images show that the fractured interface can be nicely healed (FIG. 4i). The healed strip sample can sustain a weight of 50 g that is 400 times its own weight (0.125 g) (FIG. 4h). As a contrast, control 1 polymers without disulfide bonds cannot heal the fracture interface for more than 18 h with the same healing condition. To quantify the self-healing property of disulfide-containing polymers, the inventors carried out uniaxial tensile tests on the virgin polymer strips and healed samples for various healing periods at 80° C. (FIGS. 4j-4l). The Young's modulus of the virgin polymer with PTMEG molar mass 250 g/mol is around 500 MPa, within the comparable range of modulus of atypical Teflon (200-600 MPa). As the healing time increases, the tensile strength of the healed sample increases until reaching a plateau that is the tensile strength of the virgin sample. The inventors took the healing time corresponding to 90% of the healing strength ratio (tensile strength of the healed sample normalized by that of the original sample) as the equilibrium healing time. The inventors found that the equilibrium healing time increases from 6 h to 15 h as the PTMEG molar mass increases from 250 to 1810 g/mol (FIGS. 4m-4o). This trend can be understood as follows: At 80° C. that is above the glass transition temperature, the polymer transforms to a rubbery state. The healing process is primarily governed by the coupling of diffusion of polymer chains and the reforming of dynamic disulfide bonds around the healing interface. The Rouse diffusivity of a polymer chain is $D = k_B T/(n\xi)$, where n is Kuhn segment number (understood as chain length) of the amorphous polymer chain with the disulfide bond, $\xi$ is rouse friction coefficient, $k_B$ is Boltzmann constant, and T is temperature. As the chain length increases (corresponding to increasing PTMEG molar mass), the diffusivity decreases, and the required healing time is expected to be longer.

Based on the characterization of shape-memory and self-healing properties, the inventors concluded that to obtain desirable shape-memory and efficient self-healing properties, they should design a polymer with a small molar mass of PTMEG. Here, the inventors selected the polymer with PTMEG molar weight 250 g/mol, which features an excellent shape-memory property for a thermal cycle within 35-80° C., and more than 90% healing within 6 h at 80° C.

Figure 4:
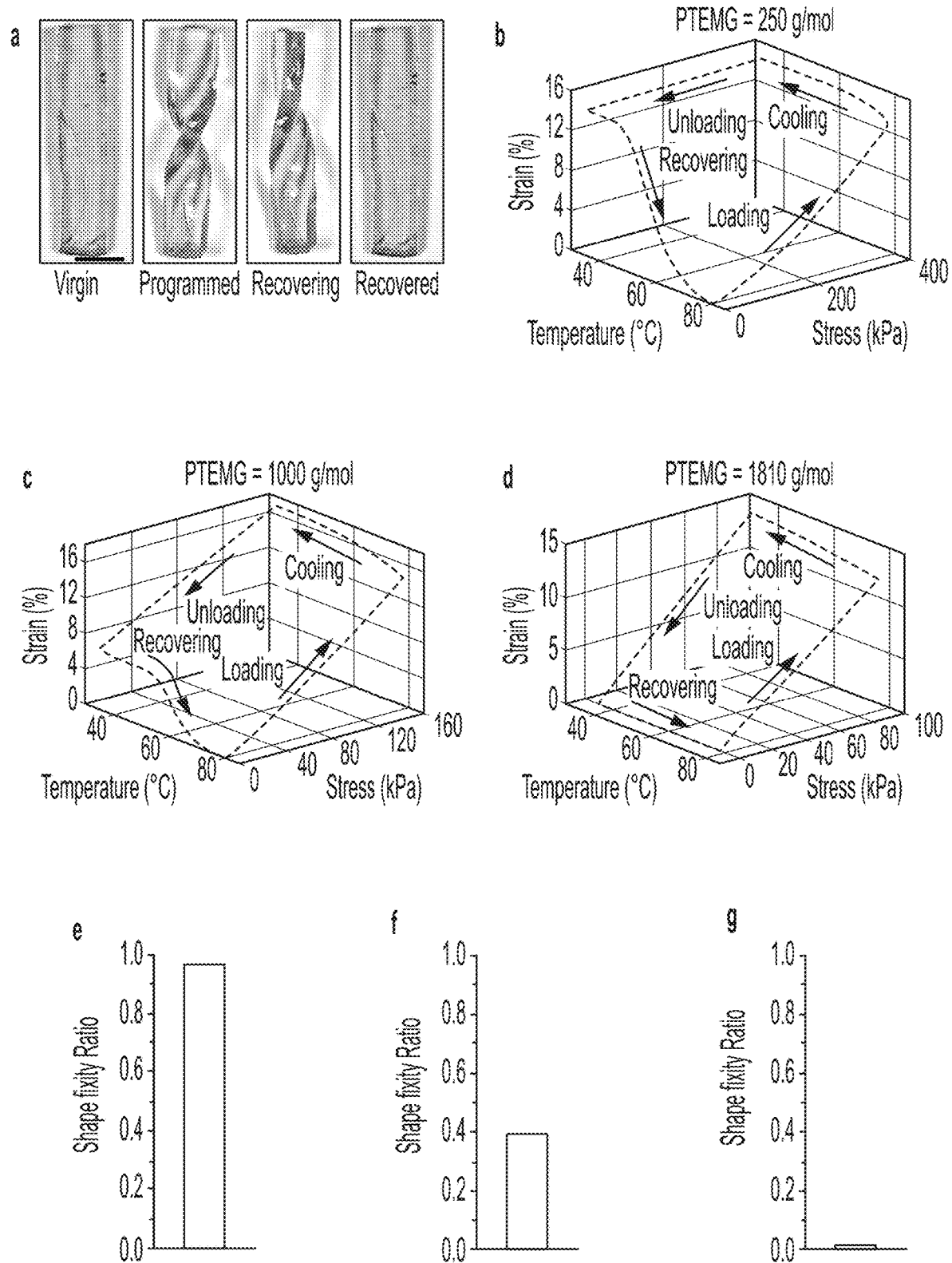
FIG. 4 is a drawing illustrating a characterization of shape-memory and self-healing properties, according to various embodiments of the present disclosure.
Figure 4:
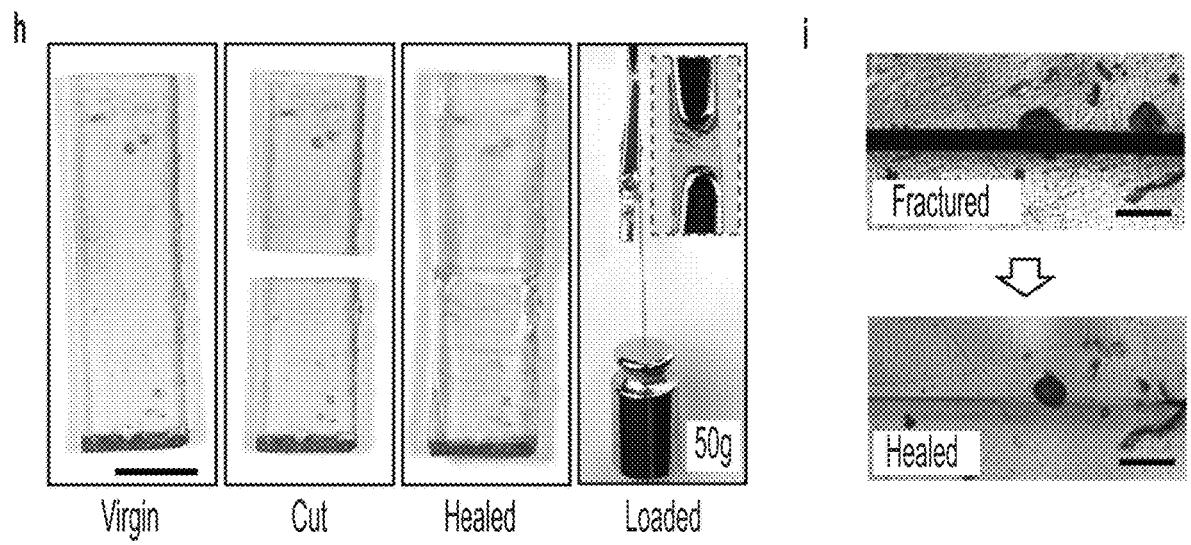
Figure 4:
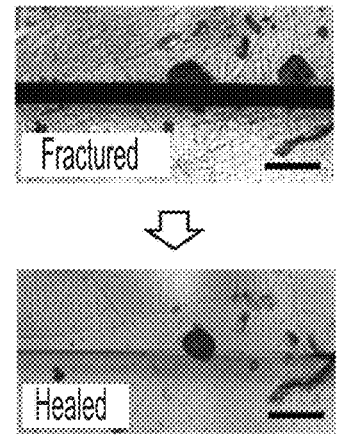
Figure 4:
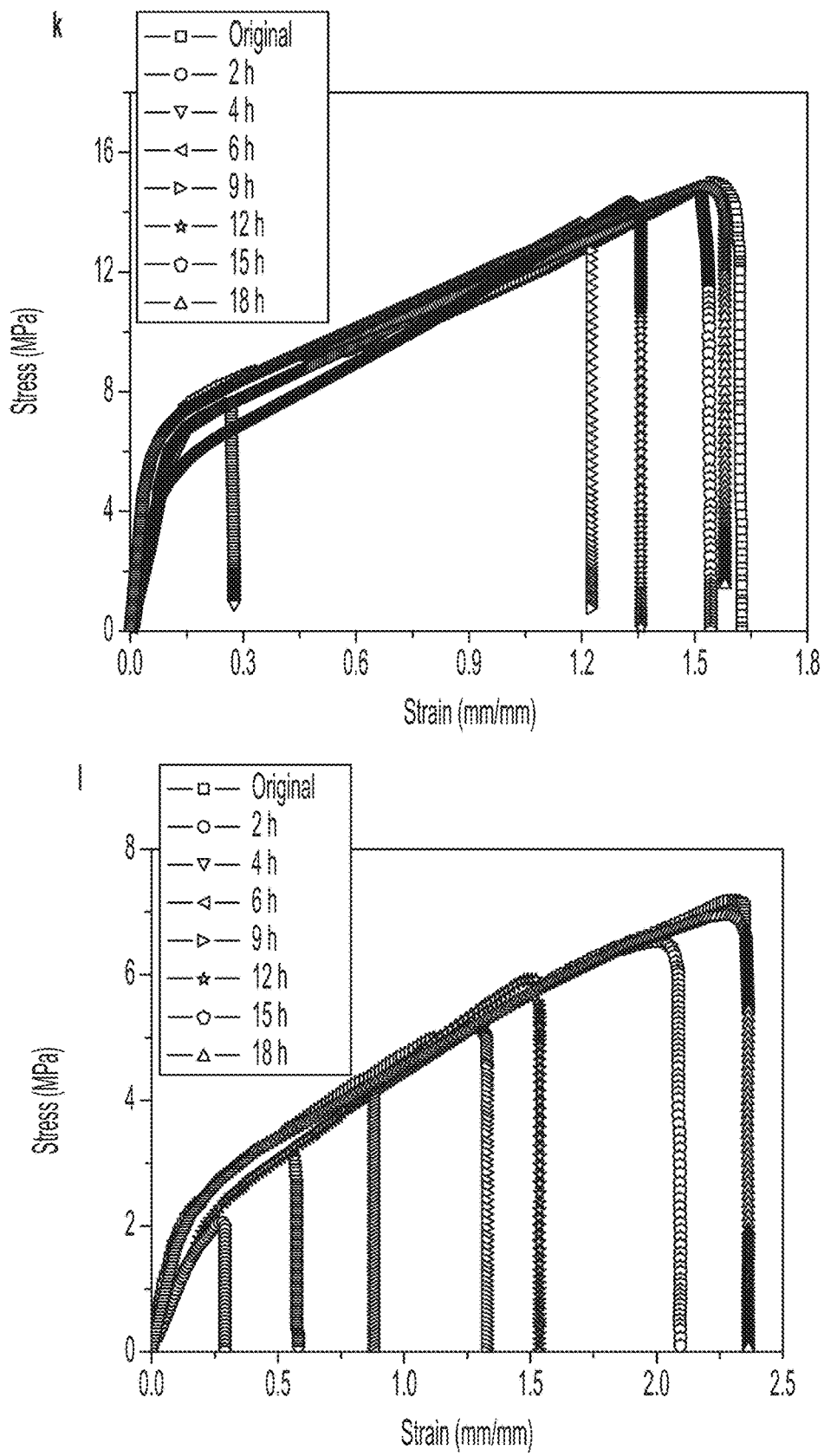
Figure 4:
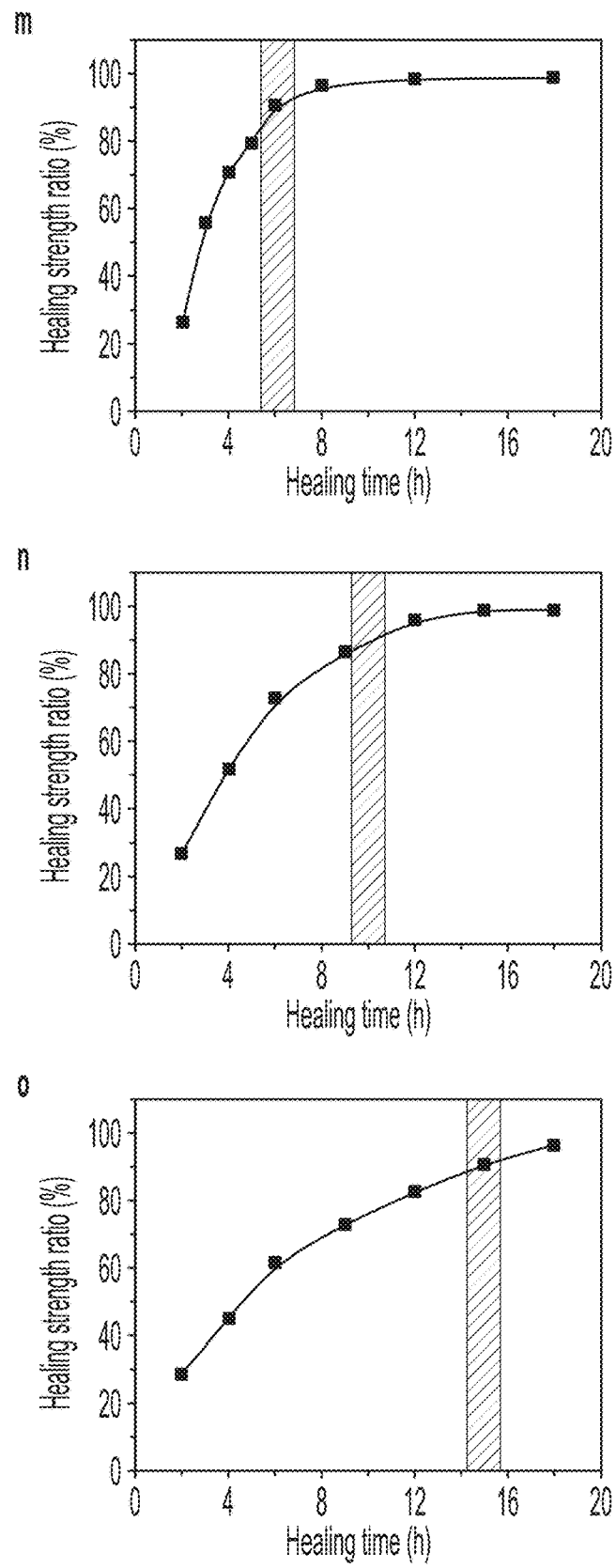

Backing up, FIG. 4 illustrates characterization of shape-memory and self-healing properties. FIG. 4a illustrates an image sequence to show a shape-memory process of a strip polymer sample. FIGS. 4b-4d illustrate stress-strain-temperature behaviors of synthesized polymers with various PTMEG molar masses within a shape-memory cycle. FIGS. 4e-4g illustrate shape fixity ratios $R_f$ of synthesized polymers corresponding to b-d. FIG. 4h illustrates image sequence to show a self-healing process of a strip polymer sample. The healed sample (0.125 g) can sustain a weight of 50 g. FIG. 4i illustrates microscope images to show fractured and healed interfaces. FIGS. 4j-4l illustrate tensile stress-strain curves of virgin polymers and healed polymers with various healing time. The polymers in FIGS. 4j-4l have various PTMEG molar masses corresponding to FIGS. 4b-4d. FIGS. 4m-4o illustrate healing strength ratios of healed polymers in functions of the healing time. The healing strength ratio is defined as the tensile strength of the healed polymer normalized by the tensile strength of the virgin polymer. The shadow areas in FIGS. 4m-4o indicate the healing time corresponding to 90% healing strength ratio. Scale bars in FIG. 4a and FIG. 4h represent 4 mm. Scale bars in FIG. 4i represent 300 μm.

Figure 5:
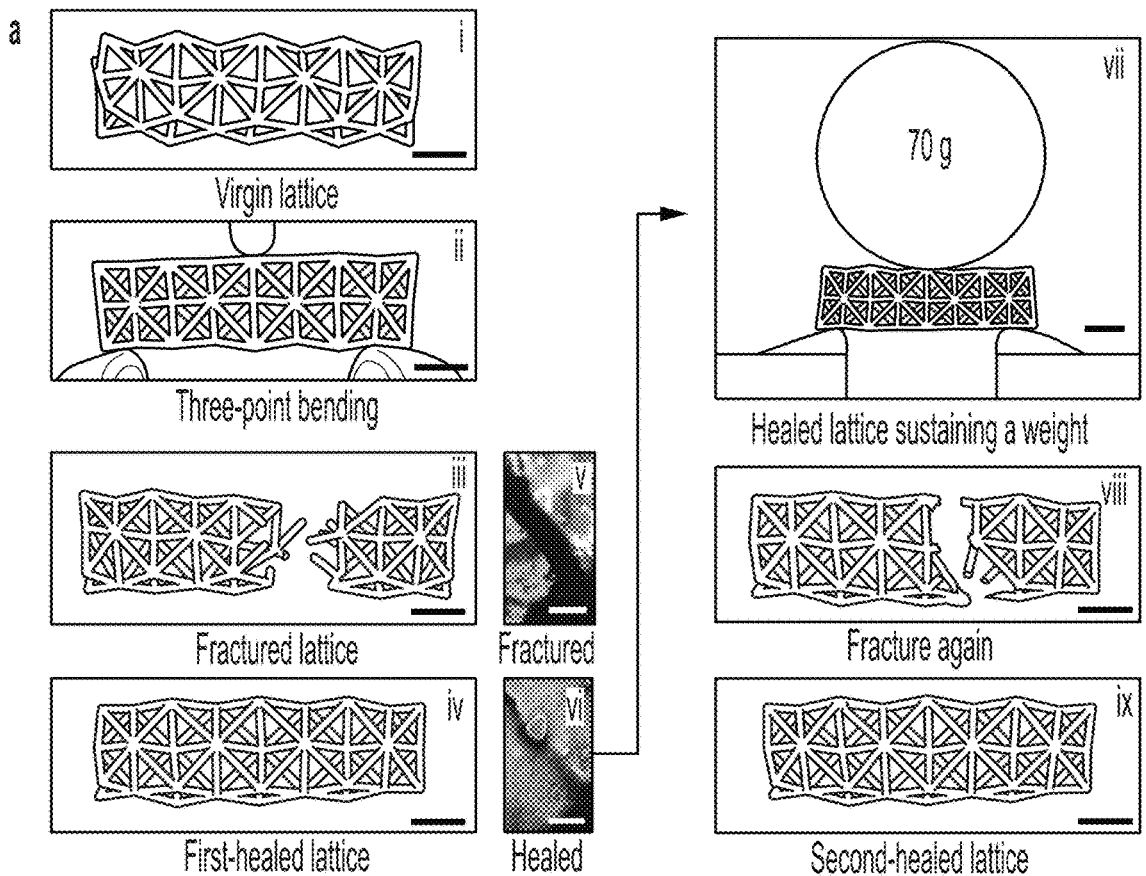
FIG. 5 is a drawing illustrating manual-contact-assisted healing of lattice structures, according to various embodiments of the present disclosure.
Figure 5:
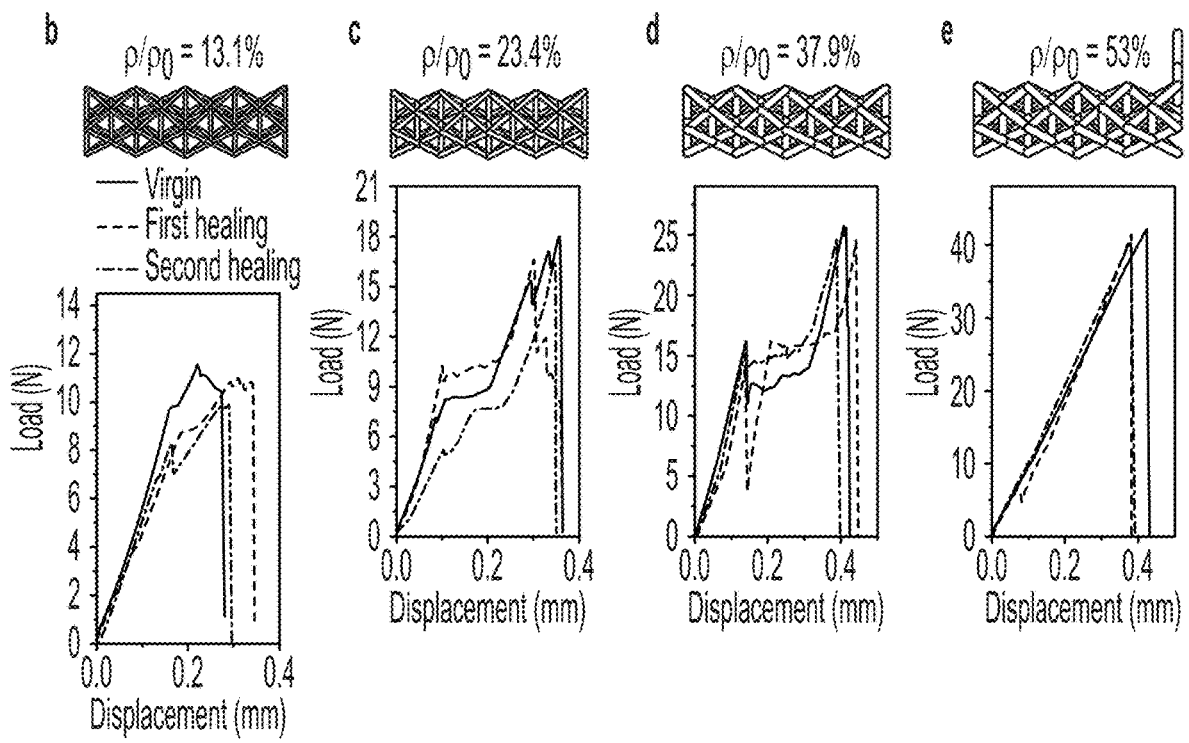
Figure 5:
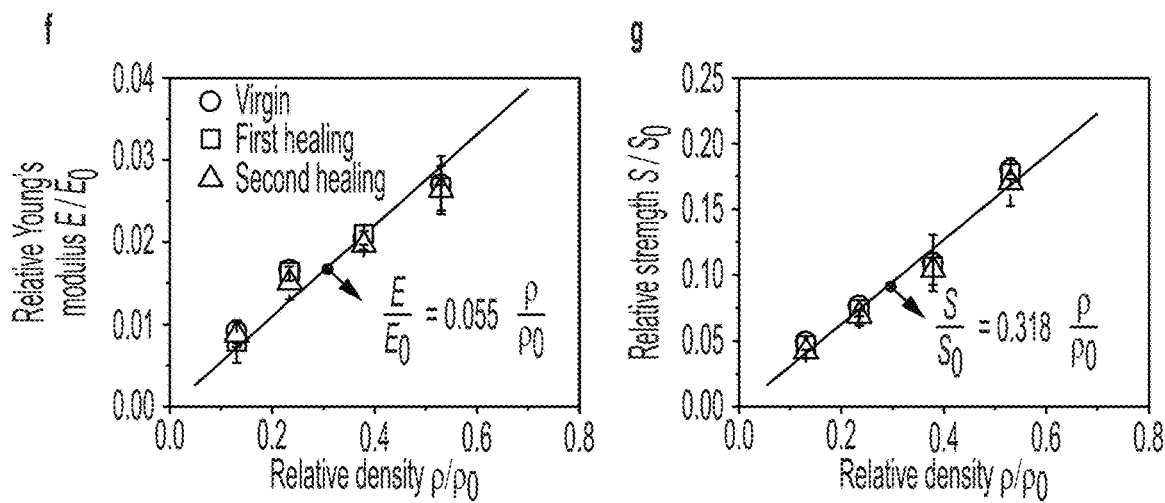

Next, the inventors studied the healing behavior of lattice structures (generally shown in FIG. 5). They first fabricated 1×1×4 octet trusses with relative densities $\rho/\rho_o$ from 13.1% to 53% ($\rho$ is effective lattice density and $\rho_o$ is material density, FIG. 5a(i)), and used a three-point-bending (3PB) load to fracture the lattices (FIG. 5a(ii-iii)). The effective Young's modulus (3.2-10.8 MPa) and flexural strengths (0.7-3.1 MPa) of octet trusses with various relative densities can be obtained from the 3PB tests (FIGS. 5b and 5e). The inventors found that the effective Young's modulus E and flexural strengths S of the octet trusses are approximately in linear functions of their relative densities (FIGS. 5f, 5g), written as:

$$\frac{E}{E_0} \approx 0.055\left(\frac{\rho}{\rho_0}\right) \quad (1)$$

$$\frac{S}{S_0} \approx 0.318\left(\frac{\rho}{\rho_0}\right) \quad (2)$$

In Equations (1) and (2), $E_o$ and $S_o$ are Young's modulus and flexural strength (tensile strength) of the parent polymer with PTMEG molar weight 250 g/mol, respectively. $E_o$ and $S_o$ can be obtained from FIG. 4j. These linear relationships (Equations (1) and (2)) are consistent with the reported theoretical prediction for the stretching-dominant octet truss.

Two fractured parts of the lattice structures are then brought into contact and placed in a glass container to maintain the contact. After 6 h at 80° C., fracture interfaces are self-repaired through the disulfide-enabled interfacial healing (FIG. 5a(iv)), verified by microscopic images of the fracture interface (FIG. 5a(v-vi)). The healed lattice can sustain a weight of 70 g, around 400 times its own weight (0.174 g) (FIG. 5a(vii)). Then, the healed lattice can be fractured by the 3PB load again, with the fracture location different from that of the first fracture (FIG. 5a(viii)). The inventors found that the effective Young's moduli and flexural strengths of the healed octet lattices (first-healed lattices) can reach above 90% of those of the virgin lattices (FIGS. 5b-5g). Besides, the fractured first-healed lattices can be healed again after 6 h at 80° C. (FIG. 5a(ix)). The linear relationships in Equations (1) and (2) are still valid for both the first-healed and second-healed lattices (FIGS. 5f, 5g). In this way, the octet lattice with relative densities $\rho/\rho_o=13.1\%$ can be repeatedly fractured and healed over 10 cycles. The effective moduli and strengths of the healed lattice structures fluctuate within 85%-105% of those of the virgin lattice, but do not show an evident degradation trend over 10 healing cycles. This appears to be the first demonstration of full healing of moduli and strengths of 3D-architected lattice structures over multiple healing cycles.

Backing up, FIG. 5 illustrates manual-contact-assisted healing of lattice structures. FIG. 5a illustrates the healing process of an octet lattice over two healing cycles: (i) illustrates a virgin octet lattice, (ii) illustrates the octet lattice under a three-point-bending (3PB) load, (iii) illustrates a fractured octet lattice, (iv) illustrates a healed octet lattice after the first healing cycle (6 h at 80° C.), (v) illustrates a microscope image to show the fractured interface, (vi) illustrates a microscope image to show the healed interface, (vii) illustrates a weight of 70 g placed on the healed lattice, (viii) illustrates the healed lattice fractured again, and (ix) illustrates the healed octet lattice after the second healing cycle (6 h at 80° C.). Scale bars in (i-iv) and (vii-ix) represent 4 mm. Scale bars in (v-vi) represent 300 μm. FIGS. 5b-5e illustrate computer-aided design models and load-displacement curves of virgin, first-healed, and second-healed octet lattices of various relative densities ($\rho/\rho_o$=13.1%, 23.4%, 37.9%, and 53%) in 3PB tests. FIG. 5f illustrates the effective Young's moduli of virgin, first-healed, and second-healed octet lattices in functions of relative densities. FIG. 5g illustrates the effective flexural strengths of the virgin, first-healed, and second-healed octet lattices in functions of relative densities. The error bars represent standard deviations of 3-5 samples.

Discussion now turns to shape-memory-assisted healing of lattice fractures. Fractures of lattice structures are typically associated with geometrical distortions of fracture surfaces. Without using manual contact, the disclosure here shows that the shape-memory effect of the lattice structure can assist the distorted interface to return to the initial geometry that the fracture interfaces are aligned and contacted, and thus, the subsequent interfacial fracture-healing can be realized. Note that the self-alignment of the fracture interface, through the shape-memory property, can work for complex geometries and deep cracks within the matrix, which are typically challenging for manual contacts.

As the first example, a lattice structure is fractured in mode I (FIG. 6a). In the damaged state (FIG. 6a(ii)), the fracture surfaces are separated with a frozen crack-open distance d. If the fracture surfaces do not contact each other, the fracture cannot be healed. The inventors first increased the temperature to 80° C. to trigger a shape memory process, which enables the crack open distance to gradually decrease to zero within 1 min (FIGS. 6a(ii-iv) and 6b). Note that the fracture interface has not been healed at this stage. Then, the inventors maintained the temperature of 80° C. for 6 h until the fracture interface was fully healed (FIG. 6a(v)). The healing is verified by microscope images of the fracture interface of a beam before and after the healing process (FIG. 6a(vi-vii)). To further verify the fracture healing, the inventors applied a 3PB load to the healed interface (FIG. 6c). The inventors found that the maximal 3PB load of the healed lattice (FIG. 6a(v)) is more than 90% of that of the virgin lattice (FIG. 6c), while the maximal 3PB load of the shape-recovered lattice with an unhealed fracture (FIG. 6a(iv)) is only 20% of that of the virgin lattice (FIG. 6c).

As the second example, a circular indenter was loaded onto a lattice structure to induce a geometrical dent to a depth h (FIG. 6d(i-iii)). The zoom-in picture shows microfractures within internal beams (FIG. 6d(iii)). Harnessing the shape-memory effect at 80° C., the dent depth can be recovered for 1.5 min, as well as enabling the alignment of fracture surfaces of internal beams (FIGS. 6d(iv), and 6e). Subsequently, additional healing for 6 h at 80° C. can further repair the microcracks of interface beams. The healing is verified by microscope images of the fracture interface of a beam before and after the healing process (FIG. 6d(vi-vii)). To further verify the fracture-healing, the inventors used the indenter to test the structural stiffness and found that the healed lattice (FIG. 6d(v)) shows ~100% stiffness of the virgin lattice, while the lattice with the recovered shape but unhealed fractures (FIG. 6d(iv)) only shows ~17% stiffness of the virgin lattice (FIG. 6f).

As the third example, the inventors demonstrated that the transformable lattice can be programmed to smartly recover impact-induced damages (FIGS. 6g, 6h). If the impact force is relatively small only to induce a dent in the lattice structure, the dent can be removed through a shape-memory process. If the impact force is relatively large to induce a punch-through hole with spike fractures (FIGS. 6g, 6h(i-ii), and 6i(i-ii)), the restoring should rely on the coupling of shape-recovery and fracture-healing. The shape-change was first recovered through a shape-memory process at 80° C. for 1.5 min, except for small detached debris (FIGS. 6h(ii-v) and 6i(ii-v)). Then, the fracture interfaces of the shape-recovered parts were fully healed through a fracture-healing process at 80° C. for 6 h (FIGS. 6h(v-vi) and 6i(v-vi)). The fracture-healing was verified by microscopic images before and after the healing process (FIG. 6i(vii-viii)). To demonstrate the advantage of the damage-restoring of the lattice structure, the inventors investigated the impact-mitigation behavior of the virgin (FIG. 6i(i)), damaged (FIG. 6i(ii)), and fracture-healed lattices (FIG. 6i(vi)) using the experimental setup shown in FIG. 6j. The inventors employed a weight (50 g) dropped from a height of 5 cm to impact the lattice structures and measured the reaction force beneath the lattice structures (FIG. 6k). The inventors found that the reaction force beneath the virgin lattice was only 16.2% (reaction force ratio) of that without a lattice structure (FIG. 6l). When the lattice was damaged, the reaction force ratio drastically increases to 94% (FIG. 6l). However, when the lattice was healed, the reaction force ratio decreased back again to 16.6% (FIG. 6l).

Figure 6:
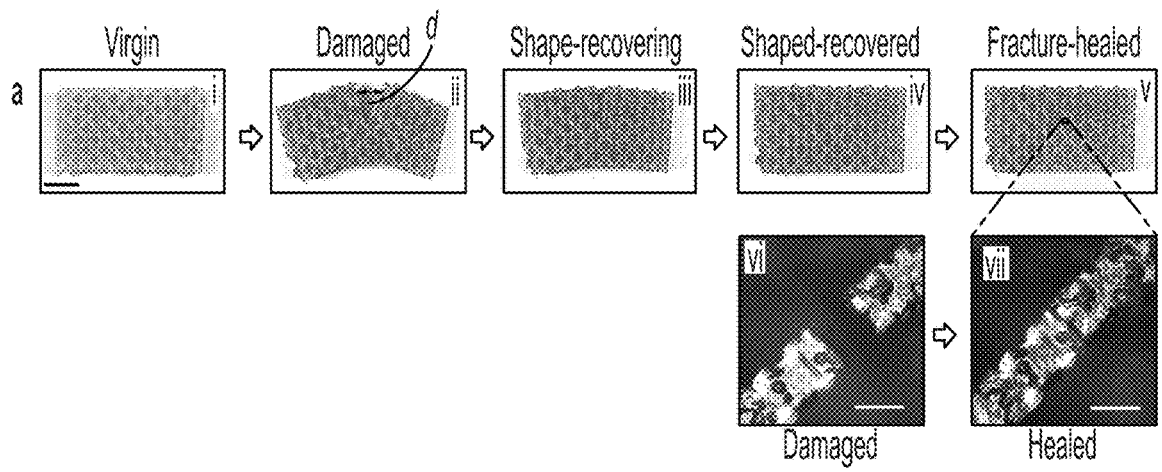
FIG. 6 is a drawing illustrating shape-memory-assisted healing of lattice fractures, according to various embodiments of the present disclosure.
Figure 6:
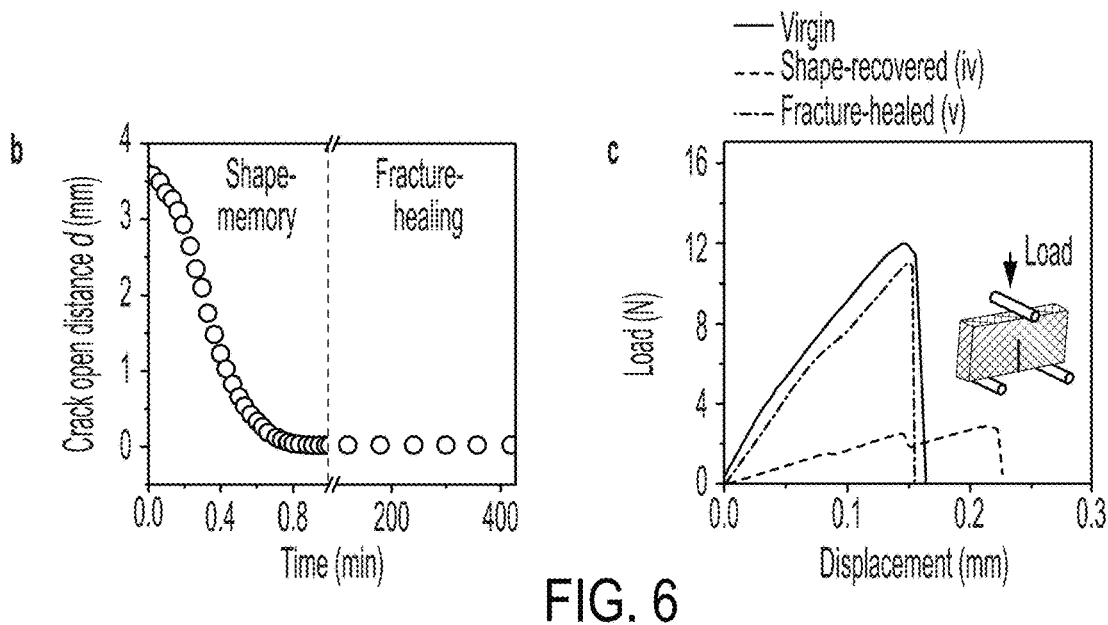
Figure 6:
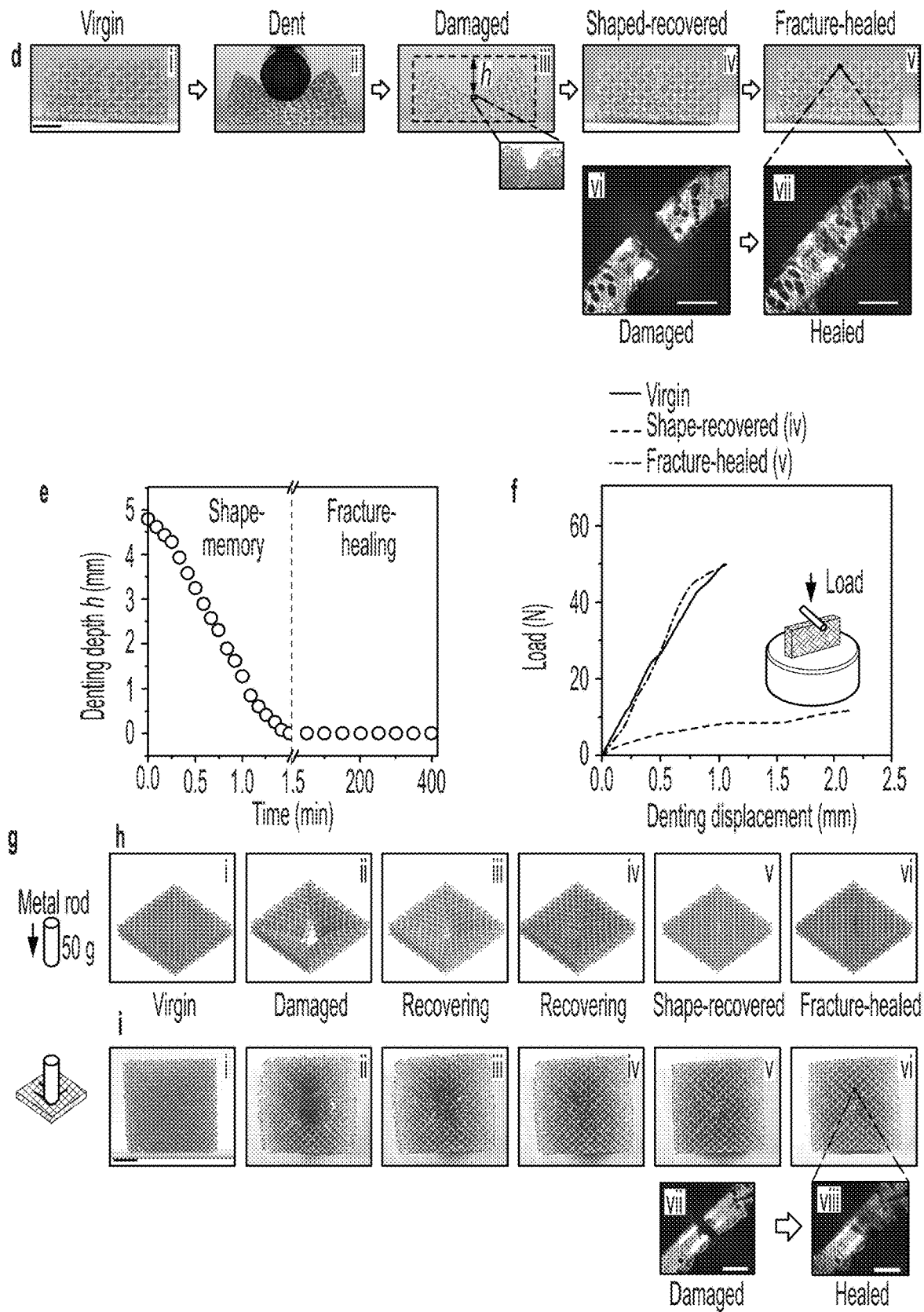
Figure 6:
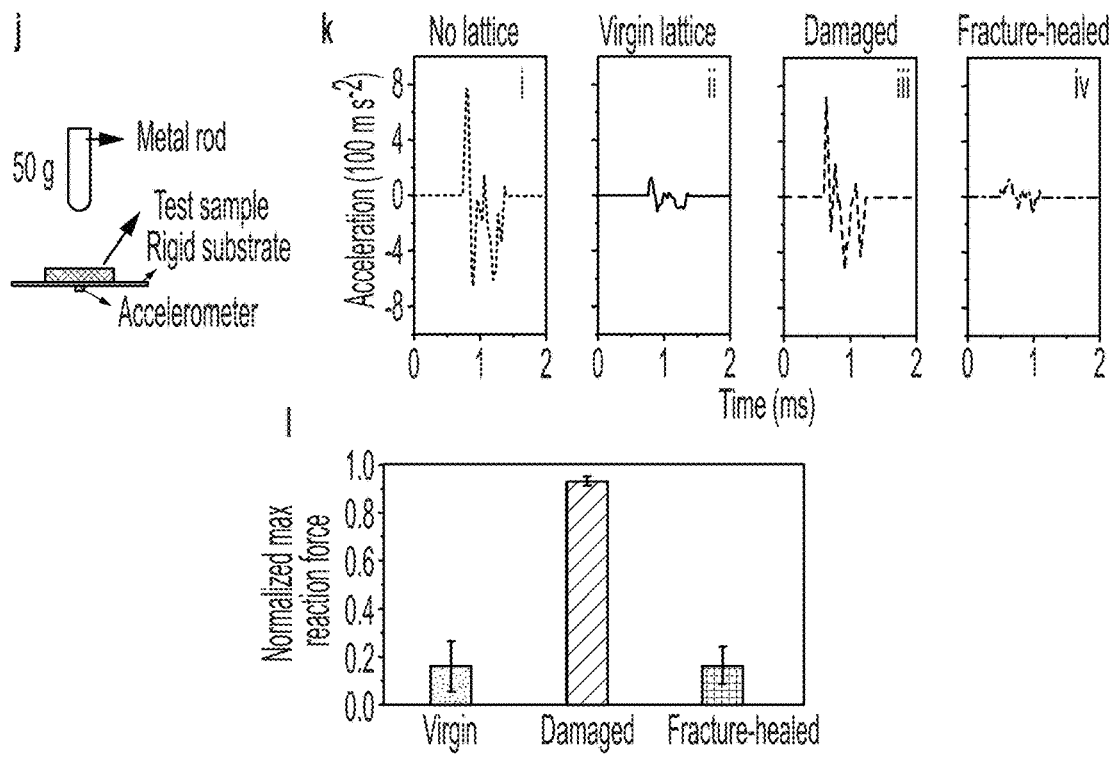

Backing up, FIG. 6 illustrates shape-memory-assisted healing of lattice fractures. In particular, FIG. 6a illustrates shape-memory-assisted healing of model-I fracture of an octet lattice: (i) virgin lattice, (ii) damaged lattice with a frozen model-I fracture, (iii) shape-recovering lattice, (iv) shape-recovered lattice with fractured interfaces, (v) healed lattice with recovered shape and healed fracture, (vi) microscope image of a fractured lattice beam, and (vii) microscope image of a healed lattice beam. FIG. 6b illustrates crack-open distance as a function of time during the shape-memory and fracture-healing processes. FIG. 6c illustrates load-displacement curves of the virgin, shape-recovered with fractured interfaces, and fracture-healed lattices in 3PB tests. The inset shows the 3PB test setup. FIG. 6d illustrates shape-memory-assisted healing of a denting-damaged octet lattice: (i) virgin lattice, (ii) lattice deformed by an indenter, (iii) damaged lattice, (iv) shape-recovered lattice with fractured beams, (v) healed lattice with recovered shape and healed fracture, (vi) microscope image of a fractured lattice beam, and (vii) microscope image of a healed lattice beam. FIG. 6e illustrates denting depth as a function of time during the shape-memory and fracture-healing processes. FIG. 6f illustrates load-displacement curves of the virgin, shape-recovered with fractured interfaces, and fracture-healed lattices in denting tests. The inset shows the denting test setup. FIG. 6g illustrates a schematic to show impact-induced damage of an octet lattice structure. FIG. 6h illustrates a schematic sequence, and FIG. 6i illustrates experimental image sequencing of shape-memory-assisted healing of the impact-induced damage of an octet lattice: (i) virgin lattice, (ii) impact-induced damaged lattice, (iii-iv) shape-recovering lattice, (v) shape-recovered lattice with fractured interfaces, (vi) fracture-healed lattice, (vii) microscope image of a fractured lattice beam, and (viii) microscope image of a healed lattice beam. FIG. 6j illustrates an experimental setup for testing reaction forces of impacts on lattice structures. The impact is applied by a dropping weight (50 g) from a height of 5 cm. FIG. 6k illustrates the impact reaction forces of cases with no lattice (i), the virgin lattice (ii), the damaged lattice (iii), and the fracture-healed lattice (iv). FIG. 6l illustrates the normalized maximal reaction forces of the virgin lattice, the damaged lattice, and the fracture-healed lattice. The normalized maximal reaction forces are calculated as the maximal reaction force of each case normalized by the maximal reaction force of the no-lattice case. The error bars represent standard deviations of 5-10 tests. Scale bars in FIGS. 6a(i), 6d(i), and 6i(i) represent 4 mm. Scale bars in FIGS. 6a(vi-vii), 6d(vi-vii), and 6i(vii-viii) represent 200 μm.

Figure 7:
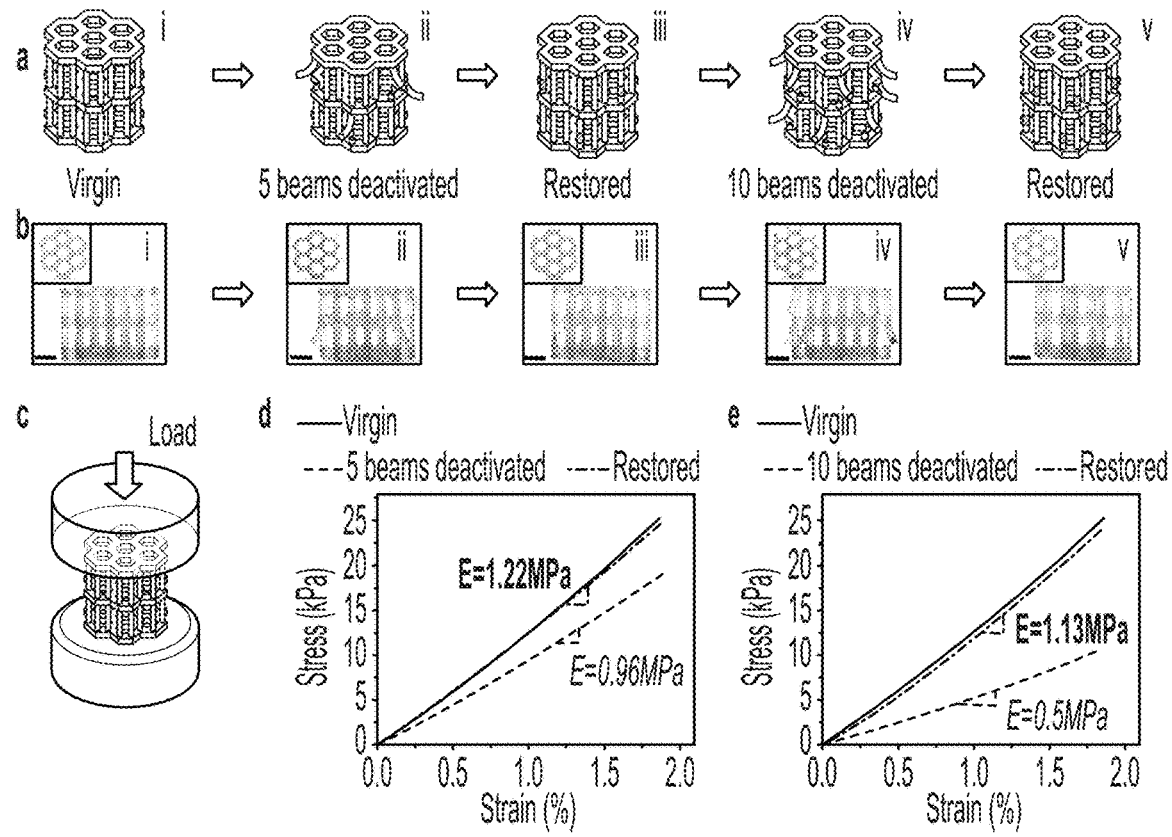
FIG. 7 is a drawing illustrating lattice transformation enabled by fracture-memory-healing cycles, according to various embodiments of the present disclosure.
Figure 7:
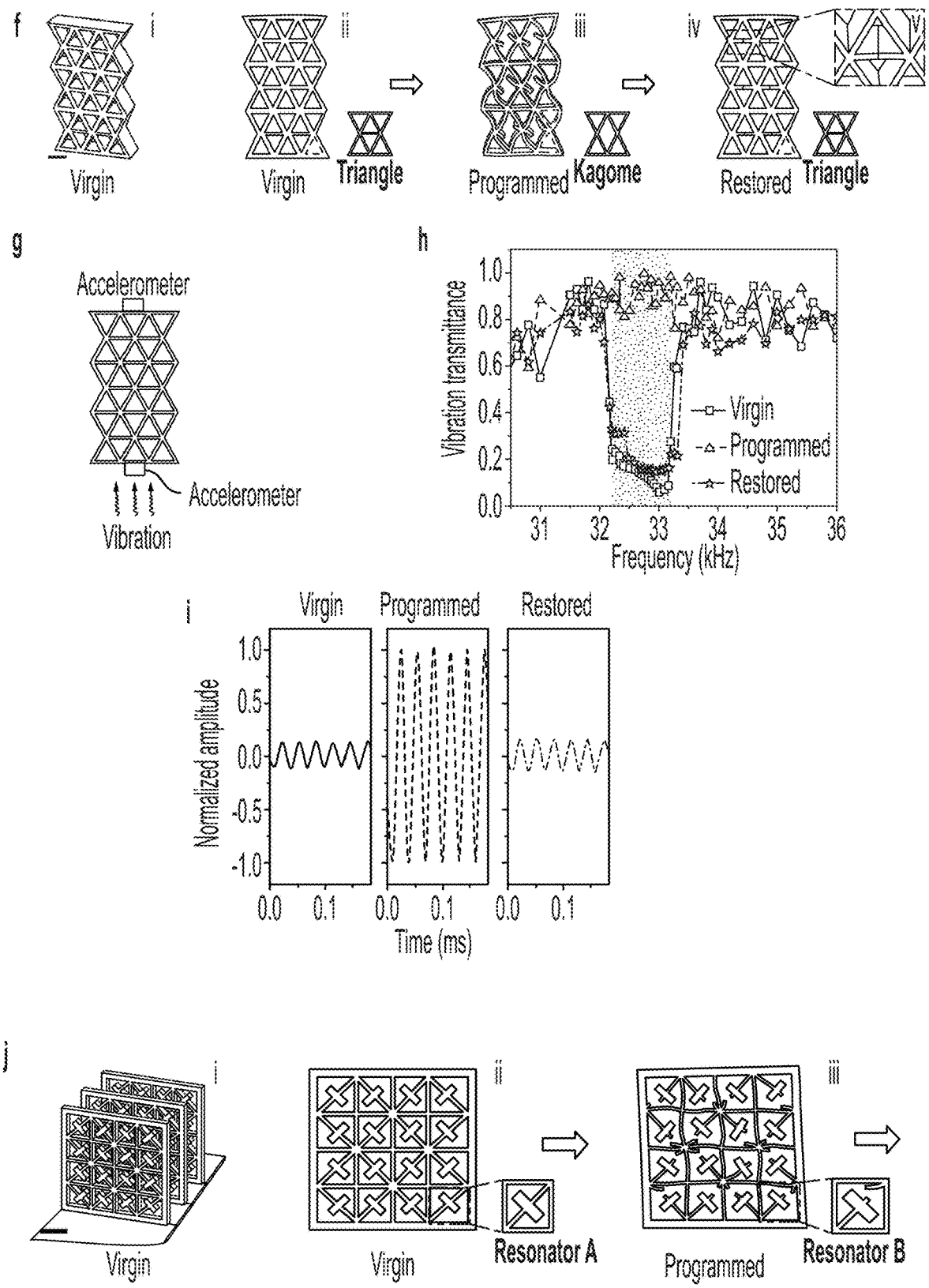
Figure 7:
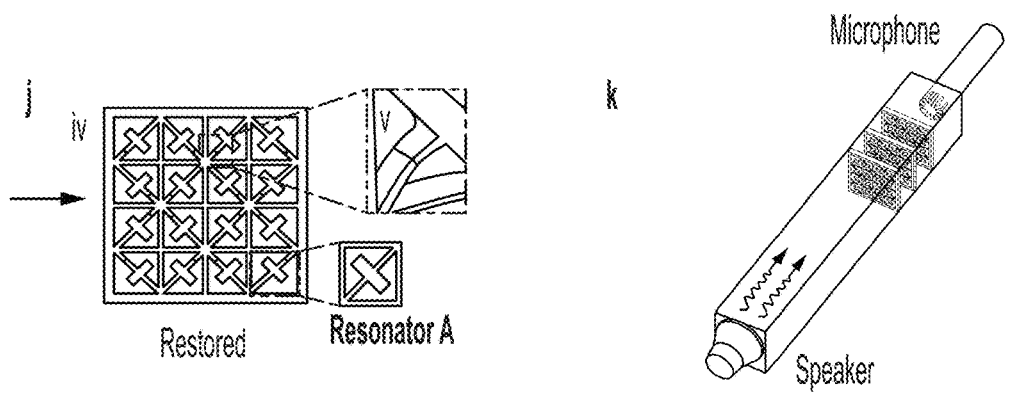
Figure 7:
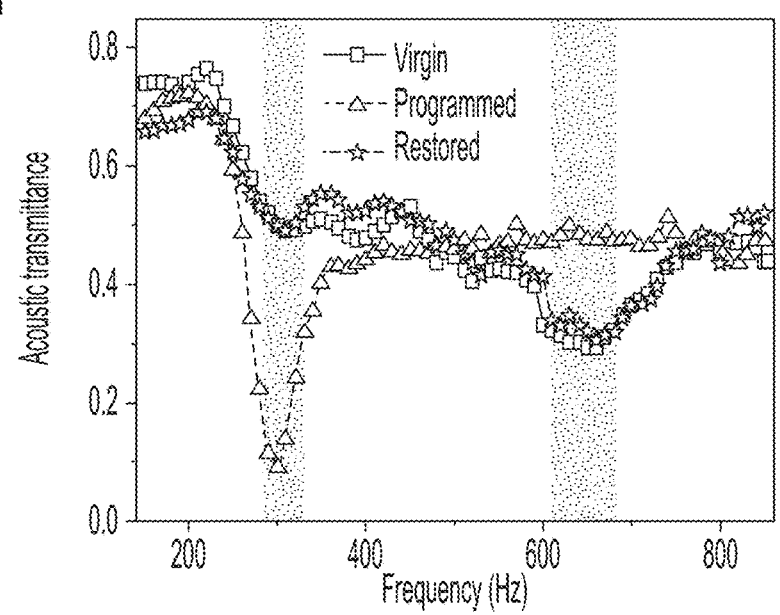
Figure 7:
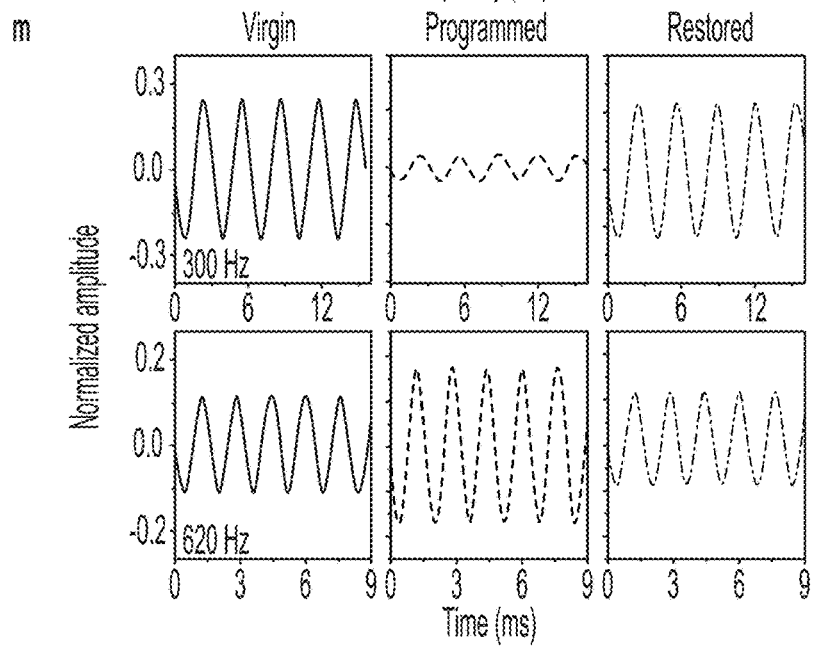

Next, the disclosure shows that harnessing fracture-memory-healing cycles can enable on-demand transformation of lattice configurations and thus lead to smart switching of static or dynamic mechanical properties of lattice structures (FIG. 7). Using a honeycomb lattice as a first example: the stiffness primarily comes from the contribution of the force-sustaining vertical beams (FIGS. 7a(i) and 7b(i)). After deactivating 5 vertical beams via fracture and bending (FIGS. 7a(ii) and 7b(ii)), the lattice exhibits a stiffness of 0.96 MPa that is 22% lower than that of the virgin lattice (1.2 MPa) (FIGS. 7c, 7d). Then the deactivated beams can be fully healed through a memory-healing process (FIGS. 7a(iii) and 7b(iii)), thus resulting in the recovery of stiffness to approximately 100% stiffness of the virgin lattice (FIG. 6d). The lattice can be further transformed to a state with 10 beams deactivated via cutting and bending, associated with 59% stiffness reduction (FIGS. 7a(iv), 7b(iv), and 7e). Then the lattice can be restored to return the stiffness to 1.1 MPa that is 92% stiffness of the virgin lattice (FIG. 7e).

As a second example, the disclosure shows that the fracture-memory-healing cycle can enable lattice transformation and thus reversible switching of vibration transmittance of lattice structures. A triangle lattice can be transformed into a Kagome lattice if the horizontal beams are deactivated via fracture and bending (FIG. 7f(i-iii)). According to reported numerical simulations, the triangle lattice displays a band gap in transmitting in-plane elastic waves within a structure-dependent frequency regime, while the Kagome lattice does not display any band gap. Motivated by the numerical simulations, the inventors experimentally measured the in-plane vibration transmittance using the setup shown in FIG. 7g. The inventors found that the triangle lattice exhibits a relatively low vibration transmittance (<0.2) within 32.2-33.2 kilohertz (kHz), while the transformed Kagome lattice presents a relatively high vibration transmittance (>0.8) within the same frequency regime (FIG. 7h). After heating the programmed Kagome lattice for ~6 h at 80° C., the lattice transformed back to the triangle lattice through a coupled process of shape-memory and fracture-healing (FIG. 7f(iii-iv)). The healing of fracture interfaces can be verified by a zoom-in picture (FIG. 7f(v)). Once back to the triangle lattice, the vibration transmittances within 32.2-33.2 kHz turn to low values (<0.2) again (FIG. 7h). As an alternative way to present the results, the normalized wave amplitudes of the lattice at three states at 32.75 kHz are shown in FIG. 7i: the programmed Kagome lattice shows a big increase of the wave amplitude and then returns to small amplitude after restoring to the triangle lattice. Note that the restoring of vibration transmittance requires the integration of shape-recovery and fracture-healing, while only shape-recovery cannot restore the vibration transmittance property.

As a third example, the disclosure shows that the structural transformation enabled by the fracture-memory-healing cycle can also switch the acoustic absorption of lattice structures (FIGS. 7j-7m). The key idea here is to reversible switch local resonators within a lattice structure. The virgin lattice consists of 16 local resonators that a rectangular island is connected to the structural frame through two thin beams (resonator A, FIG. 7j(i-ii)). After deactivating one thin beam via fracture and bending, the island and another thin beam constitute another local resonator (resonator B, FIG. 7j(iii)). The resonances of resonators A and B can be triggered by external acoustic waves with different frequencies because of the difference in the resonator structures. The local resonance within the structure can in turn trap the incoming acoustic wave, and significantly lower down the acoustic transmittance. To demonstrate the concept, the inventors measured the acoustic transmittances of the virgin and transformed lattice structures using the setup shown in FIG. 7k. The inventors found that the virgin lattice with resonators A (FIG. 7j (ii)) shows a relatively low acoustic transmittance within the frequency of 610-670 Hz; however, the transformed lattice with resonators B (FIG. 7j(iii)) exhibits a dramatic decrease of the acoustic transmittance within the frequency of 280-320 Hz (FIG. 7l). These two frequency regimes represent the resonance frequencies of resonator A and resonator B, respectively. The experimental measurements are roughly verified by numerical simulations of the acoustic transmittance of the virgin and transformed lattices. Then, the transformed lattice structure can transform back to the virgin shape via a memory-healing process (FIG. 7j(iv)). The fracture healing is verified by a zoom-in picture of the fracture interface (FIG. 7j(v)). After shape-recovery and fracture-healing, the corresponding acoustic transmittance returns to that of the virgin lattice (FIG. 7l). Overall, at 300 Hz, the transmitted acoustic amplitude can be represented by a high-low-high cycle corresponding to the virgin-programmed-restored cycle of the structure geometry, while at 620 Hz, the transmitted acoustic amplitude can be represented by a low-high-low cycle (FIG. 7m).

Backing up, FIG. 7 illustrates lattice transformation enabled by fracture-memory-healing cycles. In particular, FIGS. 7a-7b illustrate schematics and samples of honeycomb lattices in structural transformation processes: (i) virgin lattice, (ii) lattice with 5 vertical beams deactivated, (iii) lattice with 5 deactivated beams restored via shape-memory and fracture healing, (iv) lattice with 10 vertical beams deactivated, and (v) lattice with 10 deactivated beams restored via shape-memory and fracture healing. The insets in FIG. 7b show the top view of honeycomb lattices. FIG. 7c illustrates a schematic to show the compression test of a honeycomb lattice. FIG. 7d illustrates compressive stress-strain curves of virgin lattice, lattice with 5 beams deactivated, and lattice with 5 deactivated beams restored. FIG. 7e illustrates compressive stress-strain curves of virgin lattice, lattice with 10 beams deactivated, and lattice with 10 deactivated beams restored. FIG. 7f illustrates a transformation between a triangle lattice and a Kagome lattice: (i) 3D view of a virgin triangle lattice, (ii) 2D view of the virgin triangle lattice, (iii) programmed Kagome lattice via cutting and bending the horizontal beams of the triangle lattice, (iv) restored triangle lattice, and (v) a zoom-in image to show the healed interface. The insets show representative cells of the triangle and Kagome lattices. FIG. 7g illustrates an experimental setup for testing the vibration transmittances of lattice structures. FIG. 7h illustrates measured vibration transmittances of virgin triangle lattice, programmed Kagome lattice, and restored triangle lattice in functions of the vibration frequency. FIG. 7i illustrates normalized vibration amplitudes of virgin triangle lattice, programmed Kagome lattice, and restored triangle lattice at 32.75 kHz. FIG. 7j illustrates a transformation between a lattice with resonators A and a lattice with resonators B: (i) 3D view of an array of virgin lattices with resonators A, (ii) 2D view of the virgin lattice with resonators A, (iii) programmed lattice with resonators B, (iv) restored lattice with resonators A, and (v) a zoom-in image to show the healed interface. Insets show unit cells of resonators A and B. FIG. 7k illustrates an experimental setup for testing the acoustic transmittances of lattice structures. FIG. 7l illustrates measured acoustic transmittances of the virgin, programmed, and restored lattices in functions of the acoustic frequency. FIG. 7m illustrates normalized acoustic amplitudes of the virgin, programmed, and restored lattices at 300 Hz and 620 Hz.

It should be noted that fractures in FIG. 5 and FIGS. 6-7 are different. The 3PB-induced fractures in FIG. 5 occurred at room temperature, and thus manual contact may be required to assist the alignment of fracture interfaces. However, the fractures and their associated shape-change around the fracture locations in FIGS. 6-7 are programmed at elevated temperatures (80° C. for FIGS. 6a-6c and 7, and 60° C. for FIGS. 6d-6l). The elevated temperatures may be required to enable the shape-memory process to align the fracture interfaces via externally controlled thermal stimuli, rather than manual contact. This elevated-temperature is widely adopted for shape-memory polymers and structures. From a practical perspective, the shape-memory-assisted healing of the lattice fracture in FIG. 6 can be realized by judiciously heating the lattice structure when damage or fracture is expected. Fortunately, the polymer with PTMEG molar mass 250 g/mol does not become too soft at 60-80° C., but still exhibits Young's modulus as high as 140-390 MPa, still stiffer than most of 3D-printable photopolymers (modulus <100 MPa).

In summary, the present disclosure presents a class of transformable lattice structures enabled by fracture and shape-memory-assisted healing. The presented lattice structures can heal lattice fractures through the manual contact or memory-healing process. The fracture-memory-healing cycle can further enable reversible transformations of lattice configurations and thus properties among states of different stiffnesses, vibration transmittances, and acoustic absorptions. The inventors expect that the self-healable lattice structures can promote the future exploration of next-generation healable and reusable lightweight materials within blank Ashby material property space. Besides, the shape-memory-assisted healing of lattice structures revolutionizes the state-of-the-art healing paradigms that primarily rely on manual contacts to align fracture interfaces. This paradigm may greatly facilitate the healing of undetected cracks, or cracks deep into the structure, without external tethered intervention, and thus may enable broad applications in next-generation aircraft panels, automobile frames, body armor, impact mitigators, vibration dampers, and acoustic modulators. Furthermore, the existing transformable structures primarily harness the non-fracture geometrical change of smart materials; the structural transformations enabled by the fracture-memory-healing cycles open a unique avenue by adding a fracture-healing tool, probably enabling previously impossible modulation of functionalities.

Next, materials and methods used to in experiments create the self-healable and shape-memory inks and to additively-manufacture using the inks will be discussed. The materials include polytetramethylene ether glycol (PTMEG, molar masses 250, 1000, and 1810 g/mol), isophorone diisocyanate (IPDI), dimethylacetamide (DMAc), dibutyltin dilaurate (DBTDL), 2-Hydroxyethyl disulfide (HEDS), 1,4 Butanediol (BDO), 2-Hydroxyethyl methacrylate (HEMA), tributylphosphine (TBP), phenylbis(2,4,6-trimethylbenzoyl) phosphine oxide (photoinitiator), and Sudan I (photoabsorber). In the experiments, these materials were purchased from Sigma-Aldrich of St. Louis, Mo. and were used without further purification.

To prepare the inks, 0.00829 mole of PTMEG was preheated at 90° C. and bubbled with nitrogen for 1 h to remove oxygen and water. After lowering the temperature to 70° C., the preheated PTMEG was mixed with 7.369 g IPDI, 5 g DMac and 0.15 g DBTDL with magnetic stirring for 1 h. Then, a solution with 2.557 g HEDS in 20 g DMac was added drop-wisely to the mixture with magnetic stirring for another 1 h. After cooling the mixture to 40° C., 2.147 g HEMA was added in, with magnetic stirring for one more hour to complete the reaction. During the whole process, nitrogen was bubbled into the solution. The obtained solution was then put in a vacuum chamber for 12 hours to evaporate the solvent. To allow additive manufacturing of polymer ink, the solution was mixed with 1 percent by weight (wt %) photoinitiator, 0.01~0.02 wt % photoabsorber, and 0.1 wt % TBP, and then stirred for 2 h. To monitor each reaction step during the ink synthesis, the inventors employed Spectrum Two FT-IR Spectrometer (available from PerkinElmer of Waltham, Mass.) to carry out FTIR analyses. All the samples were scanned in the range of 450 to 4000 $cm^{-1}$ at a resolution of 0.5 $cm^{-1}$.

To additively manufacture using the inks, the inventors first designed 3-dimensional (3D) structures in a computer-aided design (CAD) software, which were output as STL files. Each STL file was then sliced into image sequences with a designated spacing in the vertical direction. The images were sequentially projected with 405 nanometer (nm) wavelength light onto the resin bath that was filled with a synthesized polymer ink. A motor-controlled printing stage was mounted onto the resin bath with a prescribed liquid height. The light-exposed resin was solidified and bonded onto the printing stage. As the printing stage was lifted, the fresh resin refluxed beneath the printing stage. By lowering the printing stage by a prescribed height and illuminating the resin with another slice image, a second layer was printed and bonded onto the first layer. These processes were repeated to form a 3D-architected structure. Note that a polytetrafluorethylene (PTFE, available under the brand name Teflon from DuPont of Wilmington, Del.) membrane with a low surface tension (~20 mN/m) was employed to reduce the separation force between the solidified part and the printing window. Fabricated samples were post-cured for 1 h in a UV chamber to enable the full photopolymerization of the material, and the samples were heated for 12 h at 40° C. to remove any residual solvent within the material matrix.

The inventors then characterized the self-healing properties of the resulting structure. Strip samples (having a length of 20 mm, a width of 5 mm, and a thickness of 1 mm) were prepared following the method mentioned above. Samples were first cut into two pieces with a sharp blade and then placed in contact immediately while clamped on two ends, to ensure good contact during the healing process. The samples were then put on a hot plate under 80° C. for various healing times. Both the original and healed samples were uniaxially stretched until rupture with strain rate $0.06\ s^{-1}$ with a tensile tester (Model 5942 available from Instron of Norwood, Mass.). The microscopic pictures of the healed surfaces were taken using an optical microscope (ECLIPSE LV100ND available from Nikon of Tokyo, Japan). The Raman spectroscopy analyses of the experimental and control samples were carried out using a Horiba Raman infrared microscope (available from Horiba of Kyoto, Japan) with a laser excitation wavelength 785 nm in the range of 400 to 1500 $cm^{-1}$.

The inventors then characterized the shape-memory properties of the resulting structures. The shape-memory behavior in FIG. 4 was characterized with a thermo-mechanical cyclic test programmed in a dynamic mechanical analyzer (DMA 850, available from TA Instruments of New Castle, Del.) using the controlled-force mode. The sample was pre-heated to equilibrate temperature 80° C., and then a static force was applied to the sample. The force was continuously held until the temperature cooled down to 35° C. Then, the force was released with a rate of 0.5 N/min to the initial preload 0.001N. Finally, the sample was heated back up to 80° C. again. To measure the glass transition temperature, the samples were tested with the oscillation temperature ramp program in a dynamic mechanical analyzer (DMA 850, available from TA Instruments of New Castle, Del.) and heated in the range of 20° C. to 160° C. with a rate of 5°/min. The glass transition temperature was determined using the obtained storage modulus curve as introduced in the reference. To verify the existence of crystalline domains, samples with various molar masses of the PTMEG (250, 1000, and 1810 g $mol^{-1}$) were tested using a Differential Scanning Calorimetry (DSC-8000, available from PerkinElmer of Waltham, Mass.). A sample of 5 mg was placed in the alumina plate and heated in the range of 30° C. to 160° C. with a rate of 10°/min, under the flow of ultra-high purity nitrogen. An empty alumina plate was placed in the other chamber as the reference.

Discussion now turns to manual-contact-assisted healing of octet lattices. 1 by 1 by 4 (1×1×4) octet trusses with different densities ($\rho/\rho_o$=13.1%, 23.4%, 37.9%, and 53%) were fabricated using the above-mentioned additive manufacturing process. The printed structures were first tested via a 3PB test until fracture (Model 5942 available from Instron of Norwood, Mass.). The damaged samples were brought into contact at 80° C. and then healed for 6 h at 80° C. The healed structures were tested with a 3PB test until fracture. And then, the sample was healed and broken again for the second to tenth healing cycle.

Octet lattice structures with different shapes were fabricated using the above-mentioned additive manufacturing process. The unit cell size was approximately 2 mm×2 mm×2mm. The lattices in FIGS. 6a-6d feature 2×4×8 unit cells. The lattices in FIGS. 6h-6i feature 2×9×9 unit cells. For the mode-I fracture example in FIG. 6a, the inventors employed an electric cutter (WX081L, available from Worx of Charlotte, N.C.) to cut the lattice structure into half width, bent it to open the crack to approximately 3.6 mm at 80° C., and froze the bending deformation by cooling to room temperature. The damaged lattice, with both shape-change and material-fracture, was heated to 80° C. on a hot plate to allow the crack opening to close within 1 min. The corresponding shape-memory temperature cycle was shown in FIG. 4b. The temperature of 80° C. was maintained for an additional 6 h to enable the fracture-healing. The load-displacement curves of the original (FIG. 6a(i)), shaped-recovered but fractured (FIG. 6a(iv)), and the fracture-healed lattices (FIG. 6a(v)) in the 3PB tests were obtained by the Instron mechanical tester. For the denting example in FIG. 6d, a steel rod (diameter 8 mm) was employed to dent the lattice at 60° C. until the internal beams were fractured. The experimental procedures for the shape-recovery and fracture-healing at 80° C. were the same as those of the mode-I fracture example in FIG. 6a. Denting tests were used to measure the load-displacement curves of the original (FIG. 6d(i)), shape-recovered but fractured (FIG. 6d(iv)), and the fracture-healed lattices (FIG. 6d(v)) in the center region. In FIG. 6i, a rod with a spherical end (50 g) was dropped from a height of 1 m onto the sample at 60° C. The experimental procedures for the shape-recovery and fracture-healing at 80° C. are the same that those of the mode-I fracture example in FIG. 6a. An impact-mitigation test was performed by dropping a 50 g rod from a height of 5 cm onto a rigid plastic substrate. An accelerometer (352C22, available from PCB Piezotronics of Depew, N.Y.) was attached beneath the substrate to measure the reaction acceleration during the impact. The signal was collected by an oscilloscope (TBS 1052B-EDU, available from Tektronix of Beaverton, Oreg.) when no, virgin, damaged and healed lattices were placed on the substrate.

Honeycomb lattice structures were first fabricated using the above-mentioned additive manufacturing process. A sharp blade was used to cut the selected vertical beams which were then deactivated by bending at 80° C., and then the shape was frozen by cooling to room temperature. The programmed lattice structures were heated to 80° C. for 6 h to allow shape-recovery and self-healing of the deactivated beams. The stiffnesses of the original and programmed structures (with deactivated beams) were measured using compressive tests in the Instron mechanical tester (strain rate $0.06\ s^{-1}$).

Triangle lattice structures were first fabricated using the above-mentioned additive manufacturing process. The structures were placed on the top of a vibration generator (2185.00, available from Frederiksen of South Denmark, Denmark) that was powered by a function generator (PI-8127, available from PASCO of Roseville, Calif.). Two accelerometers (352C22, available from PCB Piezotronics of Depew, N.Y.) were attached to the bottom and top of the structures. Both accelerometers were connected to a signal conditioner (482C05, available from PCB Piezotronics of Depew, N.Y.) to display the signal in an oscilloscope (TBS 1052B-EDU, available from Tektronix of Beaverton, Oreg.). The vibration transmittances of the lattice structures were measured as $|P_t/P_b|$, where $P_t$ and $P_b$ were the acceleration amplitudes of the top and bottom accelerometers. To transfer a triangular lattice to a Kagome lattice, the horizontal beams were cut with a sharp blade, and deactivated by bending at 80° C. and cooling to room temperature. To transfer the Kagome lattice back to a triangle lattice, the Kagome structure was heated to 80° C. for 6 h to allow the shape-recovery and fracture-healing.

Lattice plates with small islands were designed and fabricated using the above-mentioned additive manufacturing process. Three lattice plates were aligned with 2 cm spacing in a rectangular acrylate chamber (length 30 cm, height 5 cm and width 5 cm, available from McMaster Carr of Elmhurst, Ill.). A loudspeaker (OT19NC00-04, available from Tymphany of XinXu Town, Guangdong, China) connected to a function generator (PI-8127, available from PASCO of Roseville, Calif.) was placed at one end of the chamber to provide acoustic signal. At the other end of the chamber, a microphone (378B02 with 426E01, available from PCB Piezotronics of Depew, N.Y.) was used to collect the acoustic signal. The collected acoustic signal was processed by a signal conditioner (482C05, available from PCB Piezotronics of Depew, N.Y.) and displayed in a digital oscilloscope (TBS 1052B-EDU, available from Tektronix of Beaverton, Oreg.). The acoustic transmittance was measured as $|P_w/P_{wo}|$ where $P_w$ and $P_{wo}$ were the measured acoustic pressures from the microphone with and without lattice structures. To program the lattice structures, one thin beam in each frame was cut with a sharp blade and deactivated by bending at 80° C. and cooling to room temperature. To restore the structures, the programmed structures were heated to 80° C. for 6 h to allow the shape-recovery and fracture-healing.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A method of making an ink for use in additive manufacturing of a self-healable and shape-memorizable product, the method comprising:
    mixing a diol with isophorone diisocyanate, dimethylacetamide, and dibutyltin dilaurate to form a first solution;
    mixing the first solution with 2-Hydroxyethyl disulfide to form a second solution;
    mixing the second solution with 2-Hydroxyethyl methacrylate to form a third solution; and
    mixing the third solution with a tributylphosphine, a photoinitiator, and a photoabsorber to facilitate additive manufacturing of the ink.

2. The method of claim 1 further comprising preheating the diol with nitrogen to remove oxygen and water from the diol.

3. The method of claim 2 further comprising reducing a temperature of the diol after preheating the diol with the nitrogen and before mixing the diol with the isophorone diisocyanate, the dimethylacetamide, and the dibutyltin dilaurate.

4. The method of claim 1 further comprising magnetically stirring each of the first solution, the second solution, and the third solution after forming the first solution, the second solution, and the third solution, respectively.

5. The method of claim 1 wherein mixing the first solution with the 2-Hydroxyethyl disulfide includes adding the 2-Hydroxyethyl disulfide drop by drop.

6. The method of claim 5 wherein the 2-Hydroxyethyl disulfide is provided in a solution form.

7. The method of claim 1 further comprising reducing a temperature of the second solution prior to mixing the second solution with the 2-Hydroxyethyl methacrylate.

8. The method of claim 1 further comprising providing a nitrogen environment during the entire method.

9. The method of claim 1 further comprising placing the third solution in a vacuum chamber to evaporate any solvent after mixing the second solution with the 2-Hydroxyethyl methacrylate.

* * * * *